US009507511B2

(12) United States Patent
Ikeda

(10) Patent No.: US 9,507,511 B2
(45) Date of Patent: Nov. 29, 2016

(54) INFORMATION PROCESSING APPARATUS, INFORMATION PROCESSING METHOD, AND PROGRAM

(75) Inventor: Tetsuo Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 912 days.

(21) Appl. No.: 12/859,031

(22) Filed: Aug. 18, 2010

(65) Prior Publication Data

US 2011/0054837 A1    Mar. 3, 2011

(30) Foreign Application Priority Data

Aug. 27, 2009  (JP) ................................ P2009-197002

(51) Int. Cl.
*G01B 7/00* (2006.01)
*G01B 15/00* (2006.01)
*G06F 3/0488* (2013.01)
*G06F 3/041* (2006.01)

(52) U.S. Cl.
CPC ......... *G06F 3/04883* (2013.01); *G06F 3/0414* (2013.01); *G06F 3/0488* (2013.01)

(58) Field of Classification Search
CPC .... G06F 3/0414; G06F 3/0488; G01B 21/04
USPC ................................................. 702/155, 150
See application file for complete search history.

(56) References Cited

U.S. PATENT DOCUMENTS

| 7,629,966 B2* | 12/2009 | Anson ............................ 345/173 |
| 9,030,436 B2* | 5/2015 | Ikeda .................... G06F 3/0488 345/174 |
| 2003/0137494 A1* | 7/2003 | Tulbert ......................... 345/173 |
| 2004/0021643 A1 | 2/2004 | Hoshino et al. |
| 2004/0246228 A1* | 12/2004 | Nurmi ............................ 345/156 |
| 2006/0053387 A1 | 3/2006 | Ording |
| 2006/0132456 A1* | 6/2006 | Anson .................... G06F 3/0488 345/173 |
| 2006/0132457 A1* | 6/2006 | Rimas-Ribikauskas et al. ............................. 345/173 |
| 2008/0246730 A1* | 10/2008 | Simons ......................... 345/164 |
| 2009/0066660 A1* | 3/2009 | Ure ................................ 345/173 |
| 2009/0309616 A1* | 12/2009 | Klinghult et al. ............. 324/686 |
| 2010/0220900 A1* | 9/2010 | Orsley .................... G06F 3/0421 382/124 |
| 2010/0241993 A1* | 9/2010 | Chae ............................ 715/830 |
| 2011/0050630 A1* | 3/2011 | Ikeda ........................... 345/174 |

(Continued)

FOREIGN PATENT DOCUMENTS

JP    11-305933    11/1999

OTHER PUBLICATIONS

"Optical Touch Screen Technology", Baanto International Ltd., 2015.*
European Search Report issued Nov. 12, 2010, in Munich in corresponding EP 10 16 6787.

*Primary Examiner* — Michael Nghiem
(74) *Attorney, Agent, or Firm* — Paratus Law Group, PLLC

(57) ABSTRACT

Provided is an information processing apparatus including a position detection unit that detects a position of an operating tool pressing a screen, a pressure intensity detection unit that detects pressure intensity of the operating tool, a movement detection unit that detects a movement of the operating tool based on information on the position detected by the position detection unit, and a function providing unit that provides a specific function corresponding to an increase in the pressure intensity in a case a rest state or a subtly-moving state of the operating tool is detected by the movement detection unit and the pressure intensity detected by the pressure intensity detection unit increases.

8 Claims, 14 Drawing Sheets

(56) References Cited

U.S. PATENT DOCUMENTS

| | | | |
|---|---|---|---|
| 2011/0083078 A1* | 4/2011 | Ju | 715/738 |
| 2011/0153324 A1* | 6/2011 | Ballinger et al. | 704/235 |
| 2011/0288818 A1* | 11/2011 | Thierman et al. | 702/159 |
| 2012/0287067 A1* | 11/2012 | Ikegami | G06F 3/0488 345/173 |

\* cited by examiner

APPLICATION TO TRANSLATION APPLICATION

1 PRESS-DOWN → TRANSLATE INTO JAPANESE

2 PRESS-DOWNS → TRANSLATE INTO KOREAN

3 PRESS-DOWNS → TRANSLATE INTO GERMAN

4 PRESS-DOWNS → TRANSLATE INTO FRENCH

LONG PRESS-DOWN → CANCEL

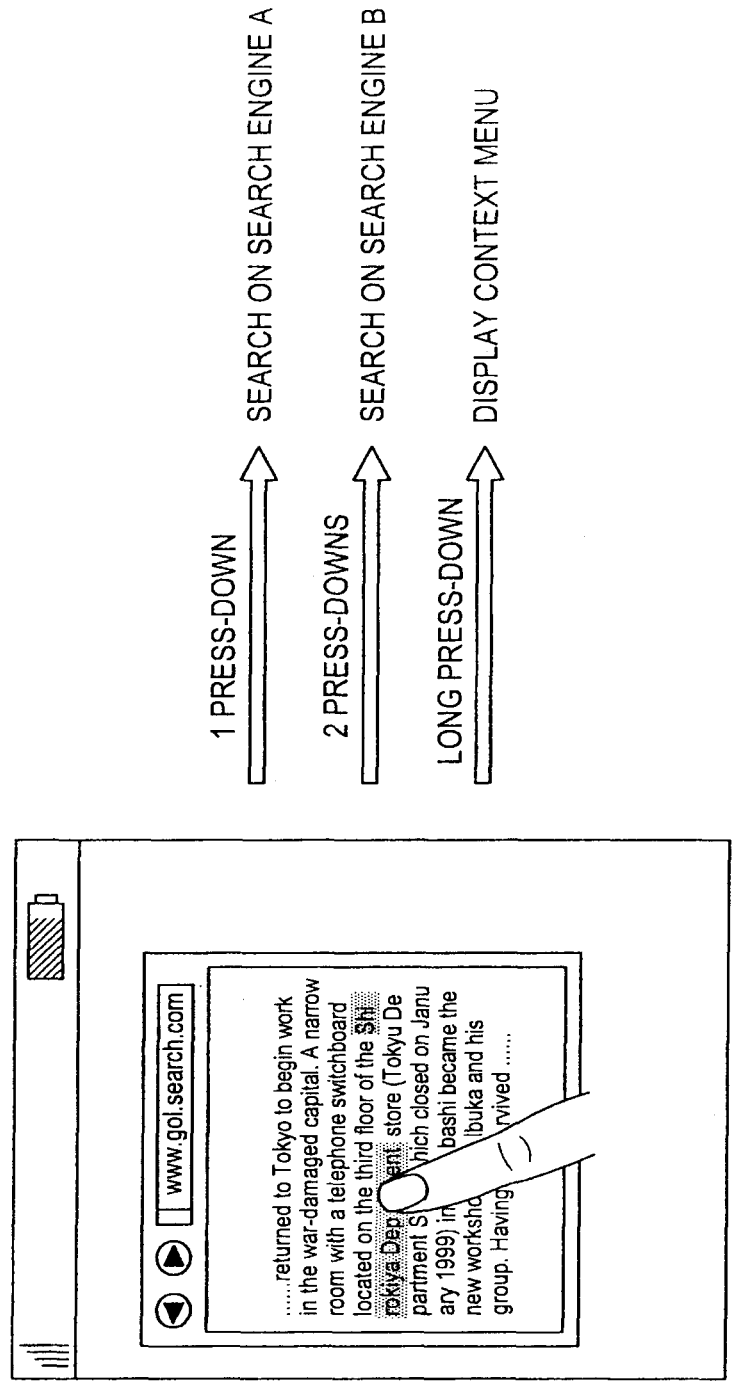

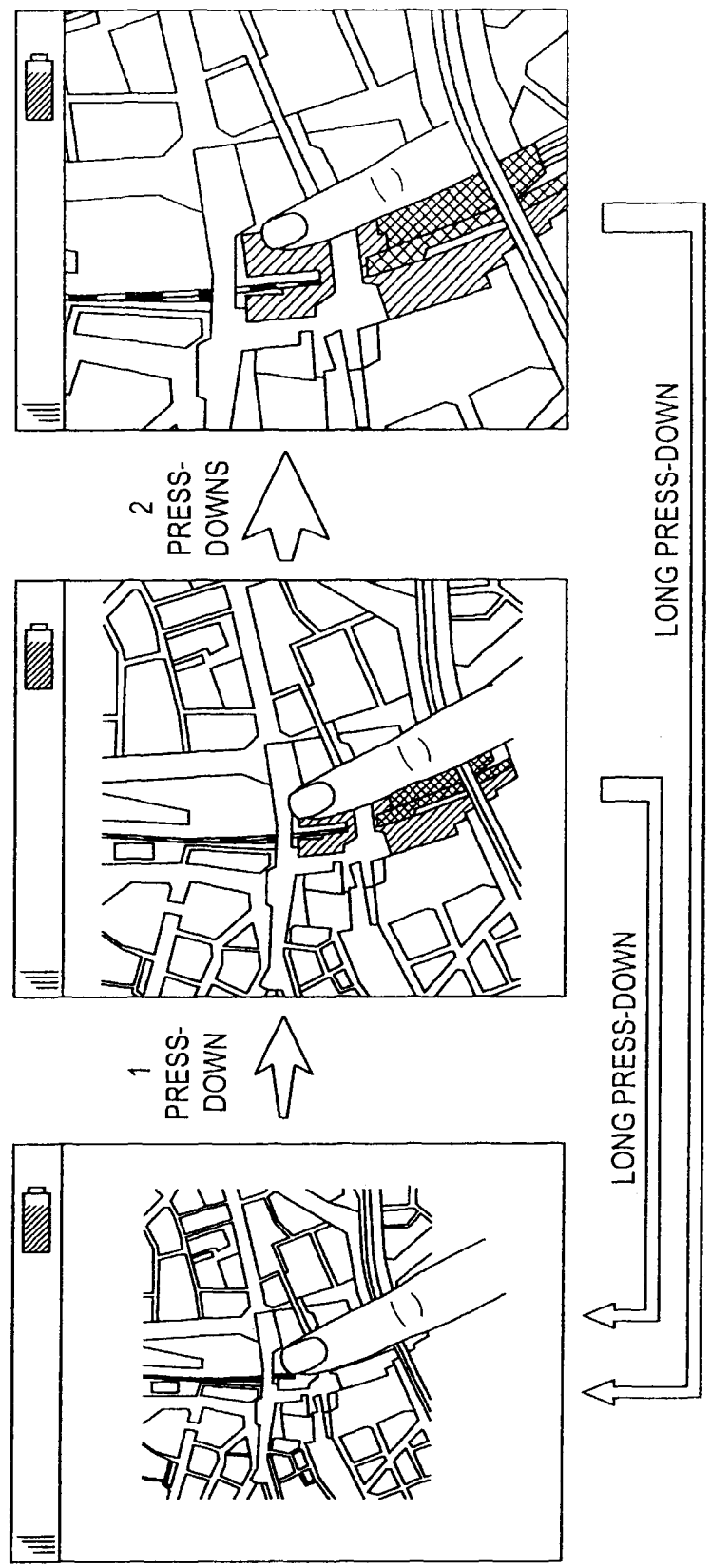

INFORMATION PROCESSING APPARATUS, INFORMATION PROCESSING METHOD, AND PROGRAM

BACKGROUND OF THE INVENTION

Field of the Invention

The present invention relates to an information processing apparatus, an information processing method, and a program.

Description of the Related Art

In recent years, a touch panel has come to be widely used by an electronic device, such as a mobile phone, a portable information terminal or the like, as an input device. The touch panel is installed in a display device such as a liquid crystal display, an organic electroluminescence display or the like. As types of touch panel, a resistive touch panel, a capacitive touch panel, and an optical touch panel are known, for example. Any of these types allows a user to perform a desired operation by directly touching or dragging an operation object displayed on the display device. Therefore, an extremely intuitive operating system is realized.

As technology relating to a touch panel, JP-A-1999-305933 discloses technology for realizing a transition to a state called "hold" according to a time period of a touch screen being touched or an area that is being touched. This "hold" described in this patent document means a transition to a special state allowing a specific input process to be performed. According to a method described in this patent document, the transition to the hold state described above is executed in a case a specific area is continuously touched for a specific period of time or longer. Like the method described in this patent document, by defining a state different from a normal state, a different function in accordance with the state can be associated with the same operation.

SUMMARY OF THE INVENTION

However, according to the method described in the patent document described above, a user has to keep touching a particular area for a specific period of time or longer to switch to the hold state. That is, the state transition takes time. It is difficult to associate such an operation which takes time with a function that calls for immediate response such as an entering process of a converted character. Also, if a state switching operation that takes time as described above is performed at the time of executing a plurality of processes that are to be successively executed, the work efficiency will significantly decrease. For these reasons, it is desired to realize an operating system which takes no time to perform an operation, which is relatively simple, and which can associate many functions with many operations.

In light of the foregoing, it is desirable to provide an information processing apparatus, an information processing method, and a program which are new and improved, and which are capable of realizing many functions by a relatively simple operation.

According to an embodiment of the present invention, there is provided an information processing apparatus which includes a position detection unit that detects a position of an operating tool pressing a screen, a pressure intensity detection unit that detects pressure intensity of the operating tool, a movement detection unit that detects a movement of the operating tool based on information on the position detected by the position detection unit, and a function providing unit that provides a specific function corresponding to an increase in the pressure intensity in a case a rest state or a subtly-moving state of the operating tool is detected by the movement detection unit and the pressure intensity detected by the pressure intensity detection unit increases.

Furthermore, the information processing apparatus may further include a time measuring unit that measures a time period the pressure intensity after increase is maintained. The function providing unit may provide the specific function that is different depending on a length of the time period measured by the time measuring unit.

Furthermore, the information processing apparatus may further include an increase/decrease counter that counts, in a case the rest state or the subtly-moving state of the operating tool is detected by the movement detection unit and the pressure intensity detected by the pressure intensity detection unit does not become zero but repeats increasing and decreasing, the number of repetitions of the increase and decrease. The function providing unit may provide the specific function that is different depending on the number of the repetitions of the increase and decrease counted by the increase/decrease counter.

Furthermore, in a case selection of a character string is performed by the movement of the operating tool, the function providing unit may provide, in a case the time period measured by the time measuring unit is short, the specific function for processing the character string selected during the movement of the operating tool, and may cancel, in a case the time period measured by the time measuring unit is long, a processing operation on the character string selected during the movement of the operating tool.

The function providing unit may provide, in a case the time period measured by the time measuring unit is short, a function of translating a character string specified as a translation target into a language that is different depending on the number of the repetitions of the increase and decrease counted by the increase/decrease counter, and may cancel, in a case the time period measured by the time measuring unit is long, a translation operation on the character string specified as a translation target.

Furthermore, the function providing unit may provide, in a case the time period measured by the time measuring unit is short, a function of searching, with a specified character string as a search target, information on a search engine that is different depending on the number of the repetitions of the increase and decrease counted by the increase/decrease counter, and may cancel, in a case the time period measured by the time measuring unit is long, a search operation having the specified character string as the search target.

Furthermore, the function providing unit may provide, in a case the time period measured by the time measuring unit is short, a function of enlarging and displaying an image that is an enlargement target at a magnification that is different depending on the number of the repetitions of the increase and decrease counted by the increase/decrease counter, and may cancel, in a case the time period measured by the time measuring unit is long, an enlargement operation on the image that is an enlargement target.

Furthermore, the information processing apparatus may further include a light source that emits light from within the screen, and an optical sensor that is capable of detecting intensity of light that is reflected by the operating tool pressing the screen at a time the light is emitted from the light source. The pressure intensity detection unit may detect an area of the operating tool that strongly reflected the light emitted from the light source based on the intensity of light detected by the optical sensor, and detects the pressure intensity based on a size of the area.

Furthermore, the information processing apparatus may further include a pressure sensor capable of detecting a pressure, the pressure sensor being provided on the screen. The pressure intensity detection unit may detect the pressure intensity of the operating tool based on a level of the pressure detected by the pressure sensor.

According to another embodiment of the present invention, there is provided an information processing method which includes the steps of detecting a position of an operating tool pressing a screen, detecting pressure intensity of the operating tool, detecting a movement of the operating tool based on information on the position detected in the step of detecting a position, and providing a specific function corresponding to an increase in the pressure intensity in a case a rest state or a subtly-moving state of the operating tool is detected in the step of detecting a movement and the pressure intensity detected in the step of detecting pressure intensity increases.

According to another embodiment of the present invention, there is provided a program for causing a computer to realize a position detection function that detects a position of an operating tool pressing a screen, a pressure intensity detection function that detects pressure intensity of the operating tool, a movement detection function that detects a movement of the operating tool based on information on the position detected by the position detection function, and a function providing function that provides a specific function corresponding to an increase in the pressure intensity in a case a rest state or a subtly-moving state of the operating tool is detected by the movement detection function and the pressure intensity detected by the pressure intensity detection function increases.

According to another embodiment of the present invention, there is provided a recording medium in which the program is recorded, the recording medium being able to be read by a computer.

According to the embodiments of the present invention described above, it is possible to realize many functions by a relatively simple operation.

BRIEF DESCRIPTION OF THE DRAWINGS

FIG. 7B is an explanatory diagram showing an example of the information processing method according to the embodiment (application to search application);

FIG. 7C is an explanatory diagram showing an example of the information processing method according to the embodiment (application to map application);

DETAILED DESCRIPTION OF THE EMBODIMENT(S)

Figure 1:
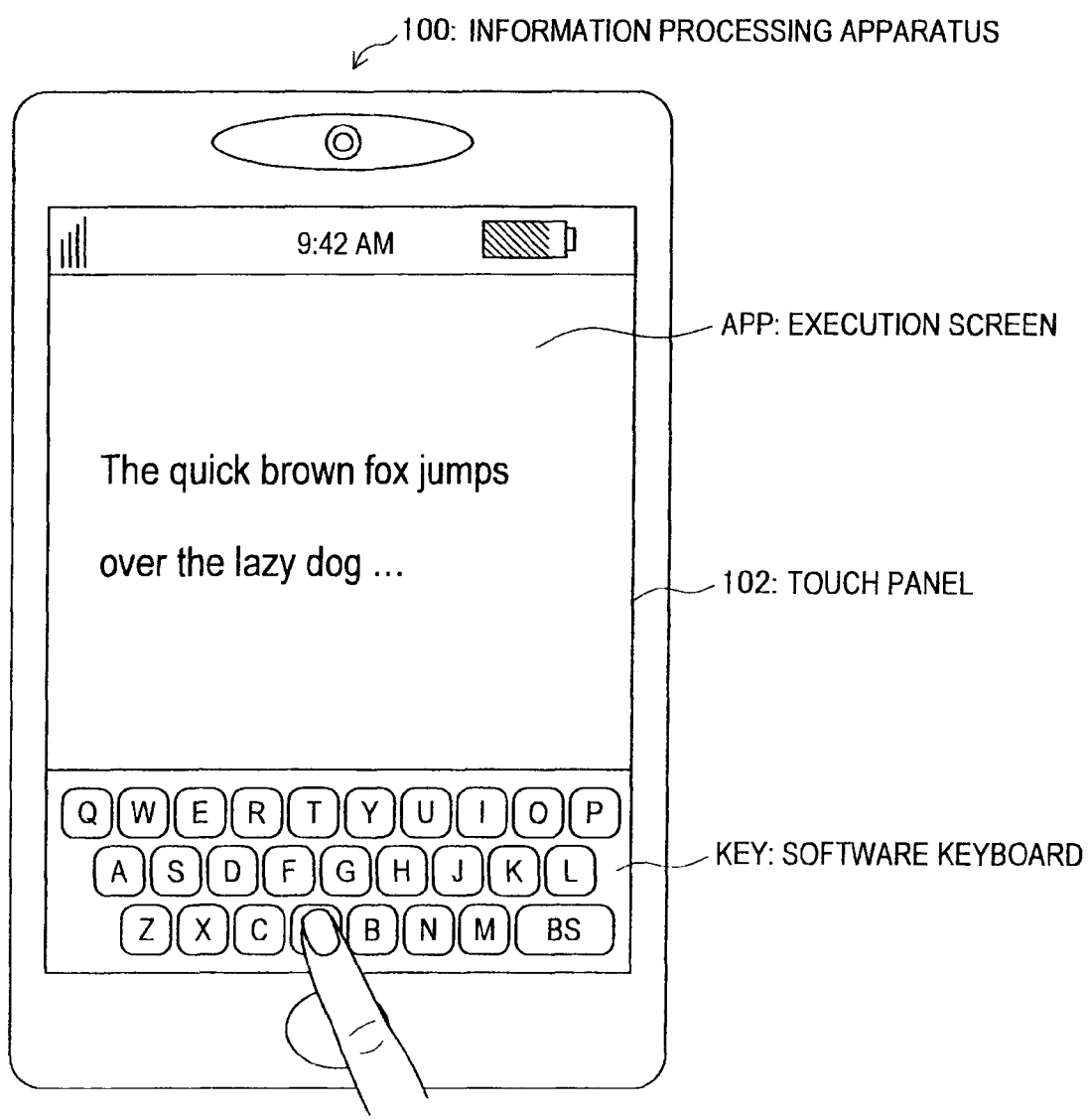
FIG. 1 is an explanatory diagram showing an external appearance of an information processing apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of description of an embodiment of the present invention described below will be briefly mentioned here.

First, an external appearance of an information processing apparatus 100 according to the first embodiment of the present invention will be described with reference to FIG. 1. Then, a functional configuration of the information processing apparatus 100 according to the embodiment will be described with reference to FIG. 2. Then, a state transition of an operation state according to the embodiment will be described with reference to FIG. 3. Then, a detection method of an input pattern according to the embodiment will be described with reference to FIGS. 4A, 4B and 4C. Then, a determination process flow for an input pattern by an information processing method according to the embodiment will be described with reference to FIG. 5.

Next, as a concrete example of the information processing method according to the embodiment, application to a character string processing application will be described with reference to FIG. 6. Then, as a concrete example of the information processing method according to the embodiment, application to a translation application will be described with reference to FIG. 7A. Then, as a concrete example of the information processing method according to the embodiment, application to a search application will be described with reference to FIG. 7B. Then, as a concrete example of the information processing method according to the embodiment, application to a map application will be described with reference to FIG. 7C.

Next, a functional configuration of an information processing apparatus 200 according to the second embodiment of the present invention will be described with reference to FIG. 8. Then, a partial operation of a shadow image area measuring unit 232 included in the information processing apparatus 200 according to the present embodiment will be described with reference to FIG. 9. Then, an example of the hardware configuration of the information processing apparatus 100 and 200 according to the first and second embodiments of the present invention will be described with reference to FIG. 10. Lastly, the technical ideas of the embodiments will be summarized and operational effects obtained by the technical ideas will be briefly described.

DESCRIPTION ITEMS

1: First Embodiment
   1-1: Configuration of Information Processing Apparatus 100
      1-1-1: External Appearance
      1-1-2: Functional Configuration
      1-1-3: Input Pattern Determination Method
      1-1-4: Application to Character String Processing Application
      1-1-5: Application to Translation Application
      1-1-6: Application to Search Application
      1-1-7: Application to Map Application
2: Second Embodiment
   2-1: Configuration of Information Processing Apparatus 200
3: Hardware Configuration Example
4: Summary 1: First Embodiment The first embodiment of the present invention will be described. This embodiment is for realizing a highly convenient operating system with a plurality of operating tools (for example, a finger, a stylus, and the like) by using a touch panel that is capable of detecting pressure intensity. Additionally, in the present embodiment, a pressure-sensitive touch panel that is capable of detecting a pressure from an operating tool is assumed as the touch panel that is capable of detecting pressure intensity. Furthermore, description will be made with the assumption that the operating tool is a user's finger. Of course, the type of operating tool to which the technology of the present embodiment can be applied is not limited to such.

<1-1: Configuration of Information Processing Apparatus 100>

In the following, the configuration of the information processing apparatus 100 according to the present embodiment will be described. Additionally, the function of the information processing apparatus 100 can be realized by using a PC (Personal Computer), a mobile phone, a portable information terminal, a car navigation system, a television, a display device, a portable audio device, a portable game machine, or the like, for example. However, in the following, description will be made with a portable information terminal in mind.

(1-1-1: External Appearance)

First, an external appearance of the information processing apparatus 100 according to the present embodiment and an outline of the technology according to the present embodiment will be described with reference to FIG. 1. FIG. 1 is an explanatory diagram showing an external appearance of the information processing apparatus 100 according to the present embodiment.

As shown in FIG. 1, the information processing apparatus 100 includes a touch panel 102. This touch panel 102 is capable of detecting a position that is touched by a user using a finger (hereinafter, a touch position), and the intensity of pressure (hereinafter, pressure intensity) obtained at the time of touching. Thus, the information processing apparatus 100 can use the information on the touch position and on the pressure intensity as input information from the user. The technology according to the present embodiment aims to realize a highly convenient operating system by using these pieces of information.

Here, an operation at the time of inputting characters by using a software keyboard KEY (see FIG. 1) will be specifically considered. The software keyboard KEY is not a keyboard that is physically provided to the housing of the information processing apparatus 100, but is a keyboard, imitating a physical keyboard, displayed on a screen by software. The touch panel 102 is provided in the information processing apparatus 100, and thus, when a character key on the software keyboard KEY is touched by a finger, which character key is touched is informed to the information processing apparatus 100. Accordingly, a function same as that of a physical keyboard can be realized.

However, with the software keyboard KEY, unlike a physical keyboard, even if a key is touched, the touched portion is not pressed down. Also, when a key on a physical keyboard is pressed down, a repulsive force is received from the key, whereas, with the software keyboard KEY, a repulsive force is not received by the finger at the touched position. Accordingly, an adjacent key may often be touched by mistake at the time of input via the software keyboard KEY.

Also, when an adjacent key is touched by mistake or is simultaneously touched, the user is unlikely to notice the mistake until a wrong character is displayed on an execution screen APP. For this reason, with character input by the software keyboard KEY, errors tend to occur in a key operation, compared to character input by a physical keyboard. When an erroneous key operation is performed, the user has to correct the input character. To delete the character that is input by mistake, a backspace key (BS) or the like is used, for example.

The user touches the backspace key and deletes the wrong character, and performs character input again by touching a correct character key. There is a possibility here that the user again performs an erroneous key operation at the time of touching the backspace key. That is, as the occasion for operating a key increases, a possibility that an erroneous key operation occurs one after the other increases. To reduce such probable occurrence of erroneous operation, it is effective to reduce the number of times of touching by the finger. Also, if the number of times of touching by the finger can be reduced, the operational steps are also reduced to that extent, allowing an efficient input operation.

The correction of characters is taken as an example here, but also with other operations, there are many cases where erroneous key operations readily occur due to the use of the software keyboard KEY. For example, a key operation performed at the time of deleting a character string selected by a drag operation may be cited as an example. In this example, it is important that the state of a selected character string is correctly maintained until the character string is deleted. However, the selected range sometimes changes after a character string has been selected, due to a momentary deviation of the finger at the time of the finger being detached.

To reduce the probable occurrence of such erroneous operation, it is effective to reduce the occasions of the finger being detached. If the occasions of the finger being detached can be reduced, the number of times of touching can also be reduced, and the probable occurrence of erroneous operation can be greatly reduced. Of course, the same can be said, not only for the deletion of a selected character string, but also for operations such as copying or cutting of the selected character string, translation of the selected character string, search performed with the selected character string as the keyword, and the like, for example. Also, the same can be said, not only for the selection of a character string, but also for the operation for performing copying, cutting, enlarging, reducing or the like after selecting a partial area of an image, for example.

In view of such circumstances, the inventor of the present application has devised a mechanism that enables to perform, by using a change pattern of the pressure intensity, a specific operation without detaching a touching finger from the touch panel 102. By using this mechanism, it becomes possible to perform many operations without detaching the finger from the touch panel 102. Accordingly, it becomes possible to perform operations, which have been performed by repeated touching, without detaching the finger, and the number of times of touching is reduced and the operational efficiency is improved. Furthermore, since the occasion of detaching the finger is reduced, it becomes possible to stably hold the housing of the information processing apparatus 100.

Heretofore, the external appearance of the information processing apparatus 100 and the outline of the technology according to the present embodiment have been described. In the following, details of the technology according to the present embodiment will be described.

(1-1-2: Functional Configuration)

Figure 2:
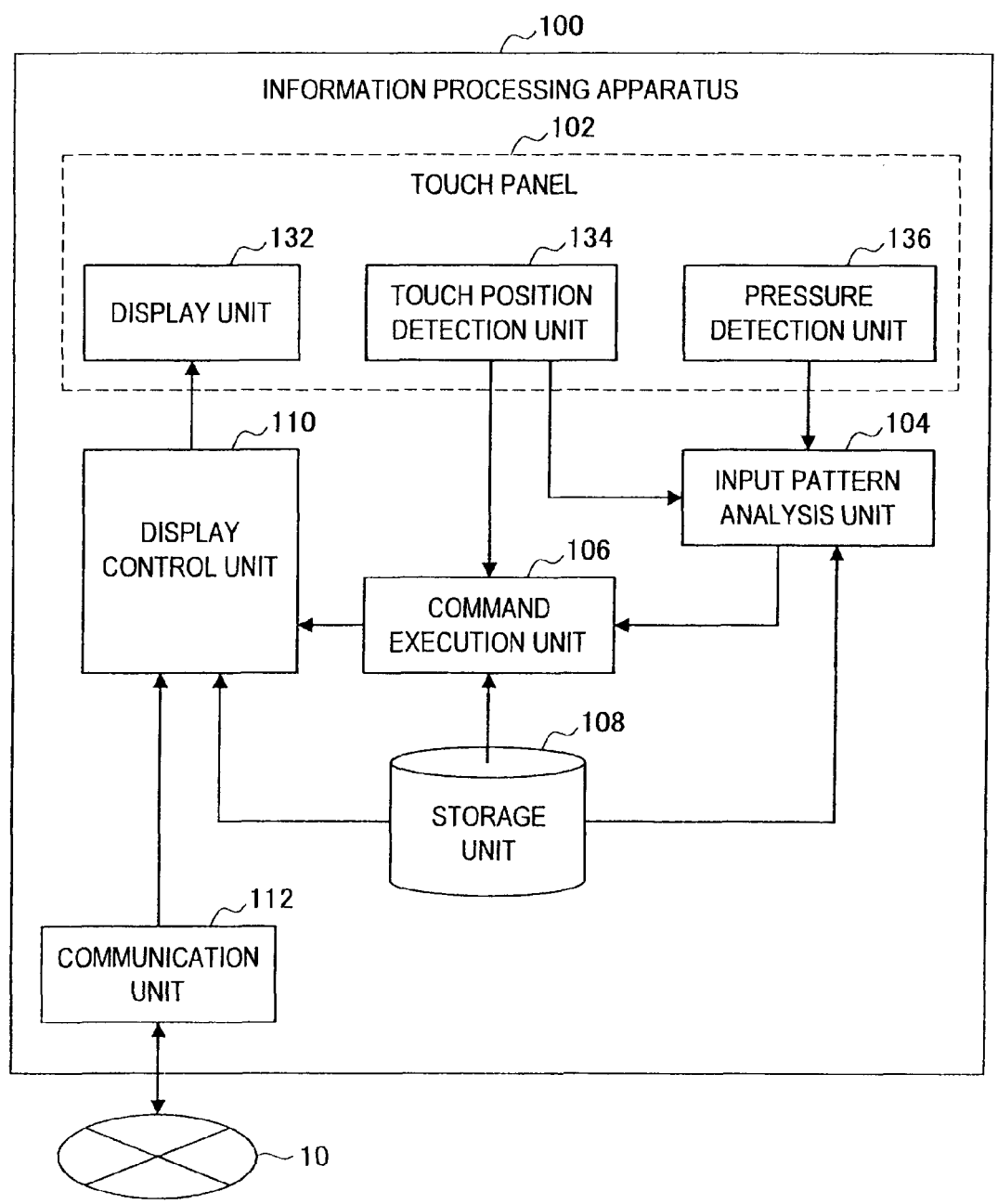
FIG. 2 is an explanatory diagram showing an example of the functional configuration of the information processing apparatus according to the embodiment.

Next, the functional configuration of the information processing apparatus 100 according to the present embodiment will be described with reference to FIG. 2. FIG. 2 is an explanatory diagram showing an example of the functional configuration of the information processing apparatus 100 according to the present embodiment. Additionally, the function of the information processing apparatus 100 illustrated in FIG. 2 can be realized by the hardware configuration illustrated in FIG. 11.

As shown in FIG. 2, the information processing apparatus 100 is configured mainly from the touch panel 102, an input pattern analysis unit 104, a command execution unit 106, a storage unit 108, a display control unit 110, and a communication unit 112. The touch panel 102 includes a display unit 132, a touch position detection unit 134, and a pressure detection unit 136.

The display unit 132 is a display device such as an LCD (Liquid Crystal Display), an ELD (Electroluminescence Display), a PDP (Plasma Display Panel), or the like, for example. Also, the touch position detection unit 134 is means for detecting the touch position. Furthermore, the pressure detection unit 136 is means for detecting the intensity of pressure (pressure intensity) at the touch position. The function of the pressure detection unit 136 is realized by a pressure measurement film, a surface pressure measurement film, or the like, for example.

First, when the touch panel 102 is touched, the touch position is detected by the touch position detection unit 134. Also, the pressure intensity at the detected touch position is detected by the pressure detection unit 136. Information on the touch position detected by the touch position detection unit 134 is input to the command execution unit 106 and the input pattern analysis unit 104. Also, information on the pressure detected by the pressure detection unit 136 is input to the input pattern analysis unit 104. When the information on the touch position and on the pressure intensity are input, the input pattern analysis unit 104 analyses the input information on the touch position and on the pressure intensity, and detects the moving state of the touching finger and the change pattern of the pressure intensity.

Figure 3:
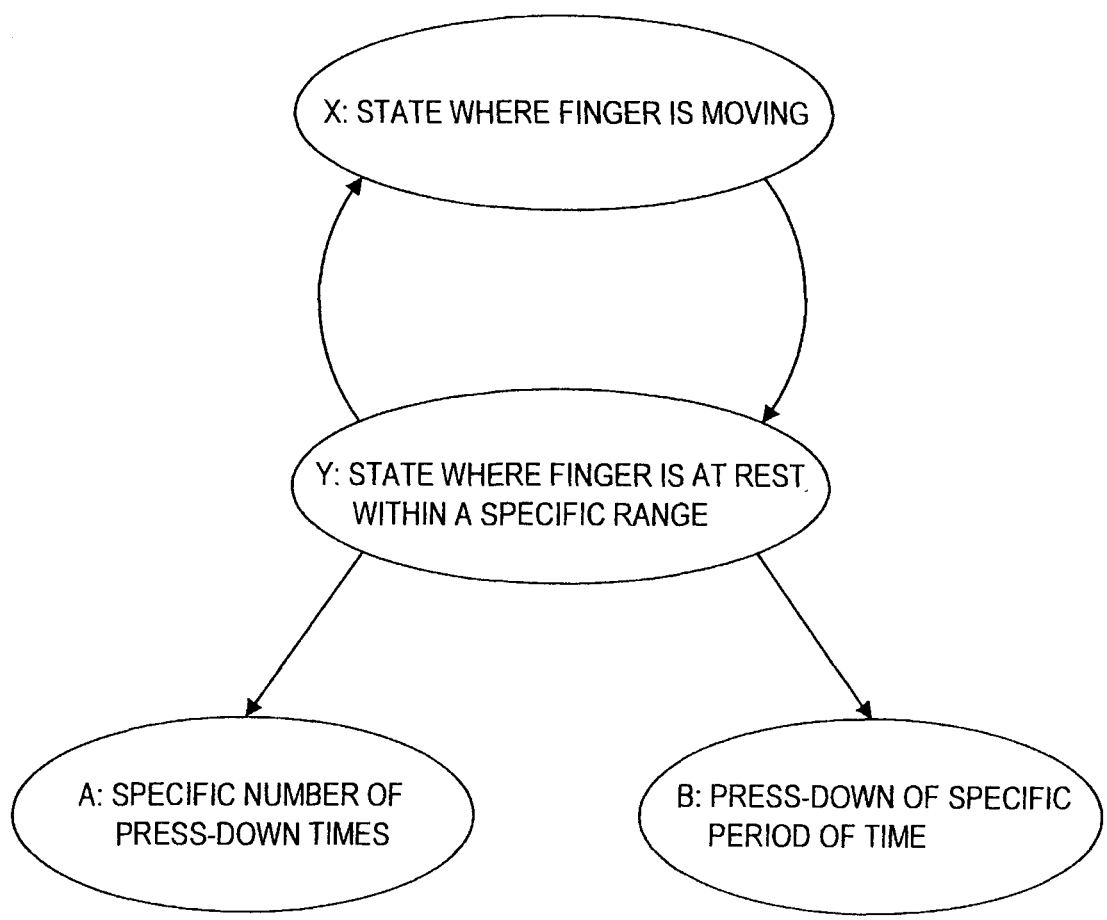
FIG. 3 is an explanatory diagram showing a state transition of an operation state according to the embodiment.

As shown in FIG. 3, the state of the finger touching the touch panel 102 can be classified into "X: a state where the finger is moving (hereinafter, moving state X)" and "Y: a state where the finger is at rest within a specific range (hereinafter, rest state Y)". The moving state X and the rest state Y can be distinguished by the information on the touch position detected by the touch position detection unit 134. Furthermore, the state of the finger can be classified into "Q: a state of pressing hard (hereinafter, press-down state Q)" and "P: a state of pressing softly (hereinafter, touching state P)". The press-down state Q and the touching state P can be distinguished by the information on the pressure intensity detected by the pressure detection unit 136.

Thus, the input pattern analysis unit 104 analyses the information on the touch position, and distinguishes whether the touching finger is in the moving state X or in the rest state Y. In the case of the rest state Y, the input pattern analysis unit 104 analyses the information on the pressure intensity, and distinguishes whether the touching finger is in the press-down state Q or in the touching state P, or whether the press-down state Q and the touching state P are repeated in turns. In the case of the press-down state Q, the input pattern analysis unit 104 measures the time period the press-down state Q is maintained. Also, in a case the press-down state Q and the touching state P are repeated in turns, the input pattern analysis unit 104 counts the number of repetitions (hereinafter, the number of press-down times).

When the number of press-down times reaches a specific number of times (state A in FIG. 3), the input pattern analysis unit 104 notifies the command execution unit 106 that there have been a specific number of times of press-downs. Also, when the press-down state Q is maintained for a specific period of time (state B in FIG. 3), the input pattern analysis unit 104 notifies the command execution unit 106 that there has been a press-down of a specific period of time. Additionally, the specific number of times and the specific period of time are registered in advance in association with a command. Also, information on the registered specific number of times and on the registered specific period of time (hereinafter, registered information) are stored in the storage unit 108. Accordingly, the input pattern analysis unit 104 reads out, as appropriate, the information on the specific number of times or on the specific period of time from the storage unit 108, and refers to the same.

When the number of press-down times is notified from the input pattern analysis unit 104, the command execution unit 106 refers to the registered information read out from the storage unit 108, and executes a command associated with the notified number of press-down times. At this time, the information on the touch position is already input from the touch position detection unit 134 to the command execution unit 106. For example, in a case a selection operation of a character string is performed and then a double press-down operation corresponding to a delete operation is performed, the command execution unit 106 identifies, based on the information on the touch position, the character string selected during the moving state X, and executes a command for deleting the identified character string. When a command is executed in this manner, display content updated in accordance with the execution of the command is notified to the display control unit 110.

Similarly, when a press-down duration is notified from the input pattern analysis unit 104, the command execution unit 106 refers to the registered information read out from the storage unit 108, and executes a command associated with the notified press-down duration. At this time, the information on the touch position is already input from the touch position detection unit 134 to the command execution unit 106. For example, in a case a selection operation of a character string is performed and then a press-down of 10 seconds corresponding to a translation operation is performed, the command execution unit 106 identifies, based on the information on the touch position, the character string selected during the moving state X, and executes a command for translating the identified character string. When a command is executed in this manner, display content updated in accordance with the execution of the command is notified to the display control unit 110.

When the display content after update is notified, the display control unit 110 makes the display unit 132 display the display content after update that is notified. Additionally, in a case the content of command execution is switching of Web pages or the like and information has to be acquired through a network 10, the display control unit 110 acquires necessary information such as the Web page after switching via the communication unit 112. Then, the display unit 132 is made to display the information acquires via the communication unit 112. Furthermore, the display control unit 110 manages a window displayed on the display unit 132. For example, the display control unit 110 generates a new window and displays information, or updates the display content of the existing window.

Heretofore, the functional configuration of the information processing apparatus 100 according to the present embodiment has been described.

(1-1-3: Input Pattern Determination Method)

Figure 4A:
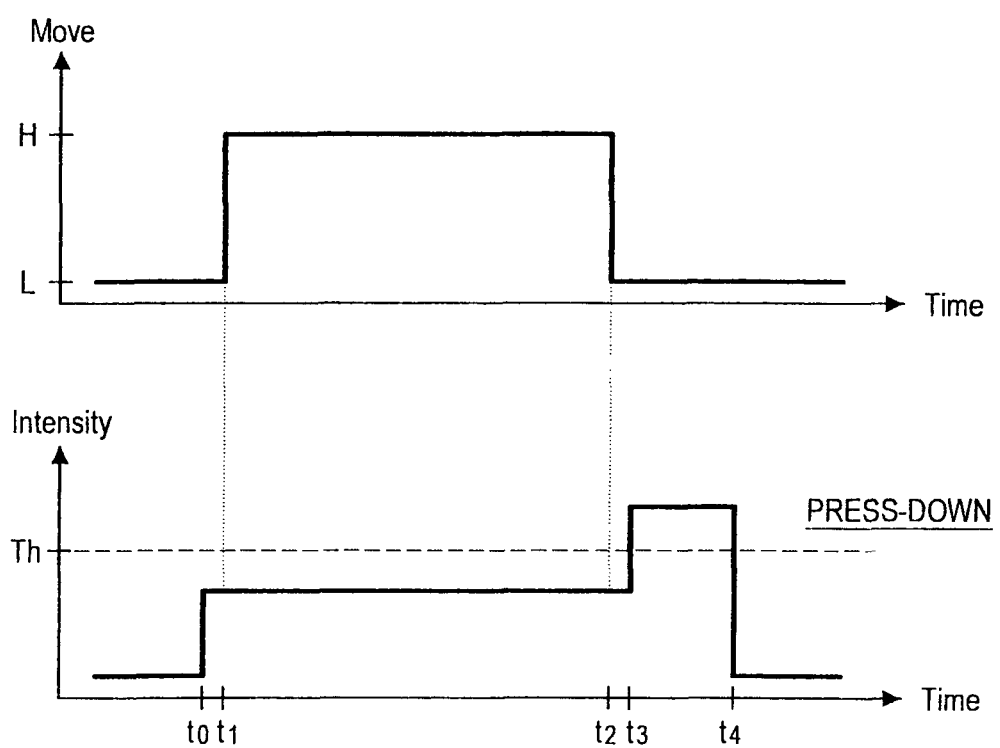
FIG. 4A is an explanatory diagram showing a partial operation of an input pattern analysis unit according to the embodiment.
Figure 4B:
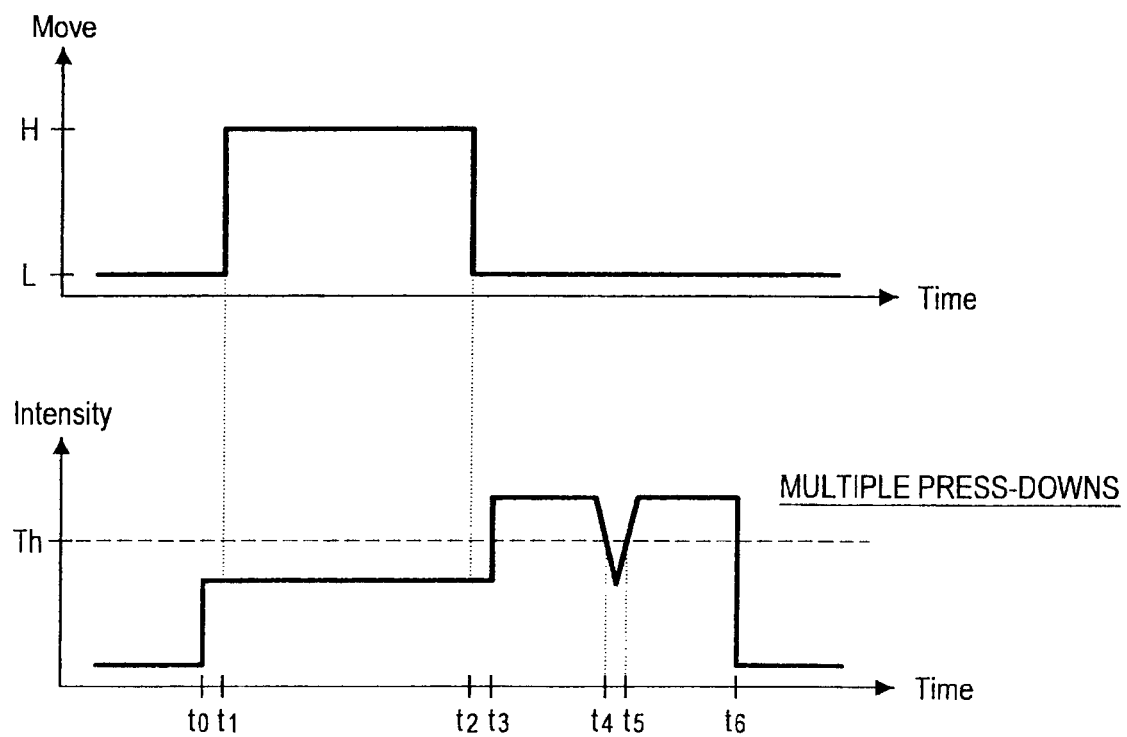
FIG. 4B is an explanatory diagram showing a partial operation of the input pattern analysis unit according to the embodiment.
Figure 4C:
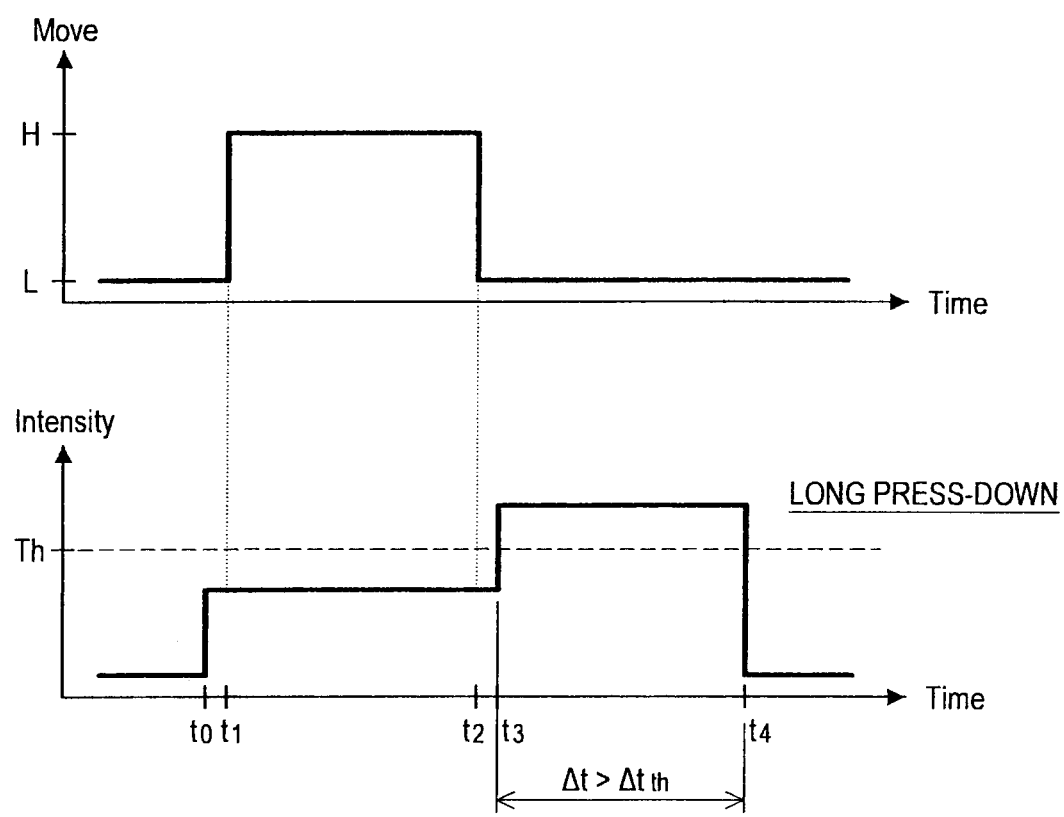
FIG. 4C is an explanatory diagram showing a partial operation of the input pattern analysis unit according to the embodiment.
Figure 5:
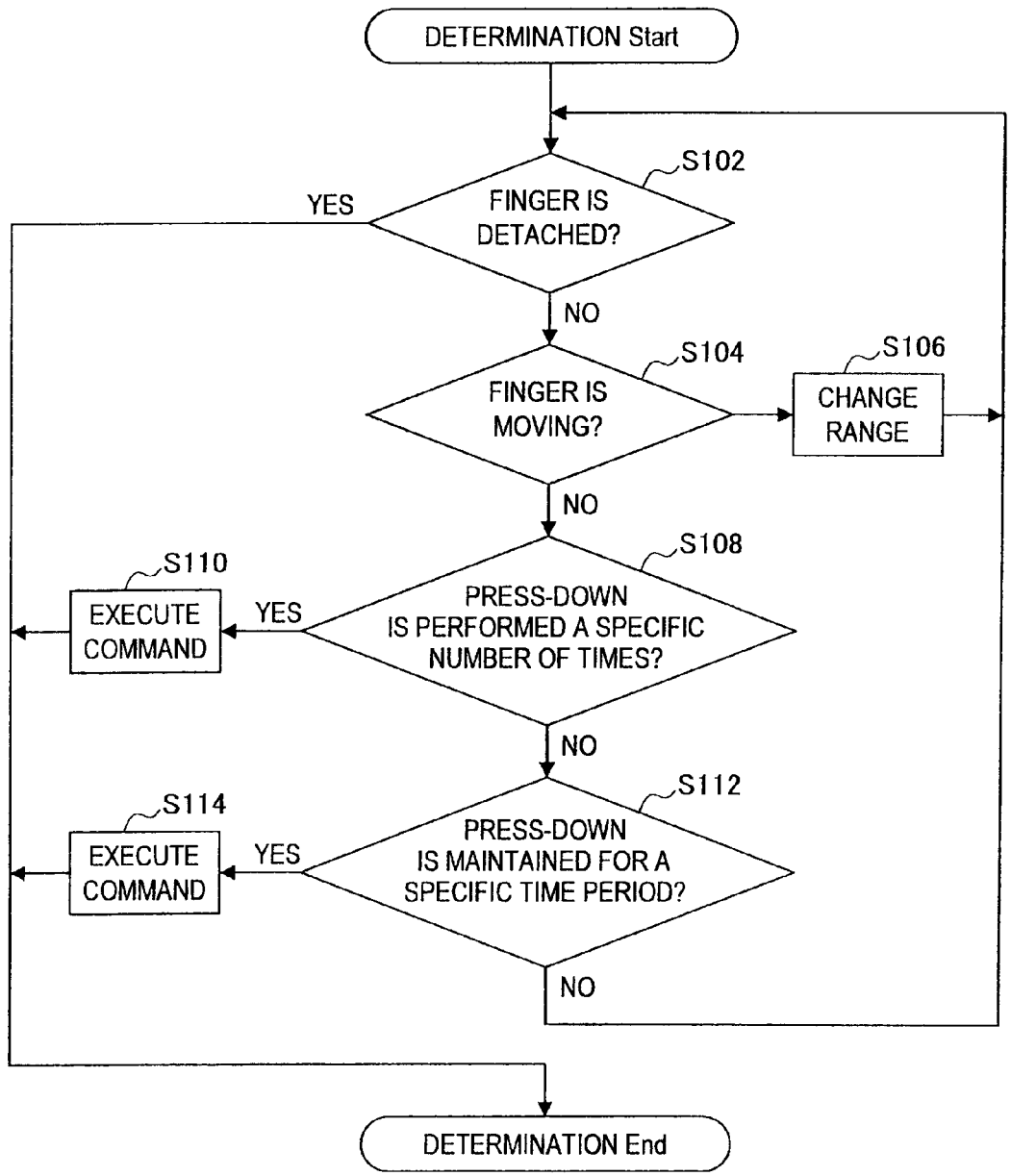
FIG. 5 is an explanatory diagram showing a determination process flow for an input pattern by the information processing apparatus according to the embodiment.

Next, an input pattern determination method according to the present embodiment will be described with reference to FIGS. 4A to 4C. Furthermore, an input pattern determination operation by the information processing apparatus 100 will be described with reference to FIG. 5. FIGS. 4A to 4C are explanatory diagrams showing input pattern determination methods according to the present embodiment. Also, FIG. 5 is an explanatory diagram showing a determination operational flow for an input pattern by the information processing apparatus 100.

(Determination Method: One Press-Down Operation)

First, reference will be made to FIG. 4A. The upper half of FIG. 4A (Move-Time; hereinafter, movement data) shows the change in the state of a finger (H: moving state X, L: rest state Y) obtained from information on the touch position. Also, the lower half of FIG. 4A (Intensity-Time; hereinafter, intensity data) shows the change in the state of the finger (touching state P/press-down state Q) obtained from information on the pressure intensity. The example of FIG. 4A is obtained in a case a finger moves while in a touching state and then presses down while in a rest state.

Additionally, Th shown in the drawing indicates a specific threshold value used for distinguishing between the touching state P and the press-down state Q. This threshold value Th is determined in advance for each user. For example, the pressure intensity in the touching state P and the pressure intensity in the press-down state Q are registered by a user at the time of activation of the information processing apparatus 100, and the threshold value Th is determined based on the registered pressure intensities. Also, the value of the threshold value Th may also be suitably adjusted, after the activation of the information processing apparatus 100, by using the distribution of pressure intensities obtained at a time an input operation is performed by the user. The timing of determining the threshold value Th may be changed as appropriate according to the mode of embodiment.

Now, when the user touches the touch panel 102 ($t_0$), the touch position is detected by the touch position detection unit 134, and is input to the input pattern analysis unit 104. When information on the touch position is input, the change in the touch position that is input is analysed by the input pattern analysis unit 104, and whether the moving state of the finger is in the moving state X or in the rest state Y is distinguished.

Furthermore, the pressure intensity is detected by the pressure detection unit 136 at the time point of $t_0$, and is input to the input pattern analysis unit 104. When information on the pressure intensity is input, whether the input pressure intensity is above the threshold value Th or not is determined and whether the pressing state of the finger is the touching state P or the press-down state Q is distinguished, by the input pattern analysis unit 104. In the example of FIG. 4A, it is detected that it is rest state Y+touching state P at the time point of $t_0$.

Next, when the finger moves while still touching ($t_1 \rightarrow t_2$), the input pattern analysis unit 104 detects the moving state X based on the information on the touch position input from the touch position detection unit 134. For example, the input pattern analysis unit 104 determines that the state of the finger is the moving state X, in a case a major change in the touch position that exceeds a specific range is detected.

Normally, it is difficult to keep a finger in a completely still state, and the finger keeps moving slightly even if it is intended to be kept still. Accordingly, a specific range is set so that a subtle movement of the finger is not erroneously determined to be the moving state X. For example, a circular area with a specific radius, having as its centre the touch position obtained by the touch position detection unit 134 in the rest state Y, is set as the specific range, and when a touch position is within the range, it is determined to be the rest state Y.

In the example of FIG. 4A, the finger is determined to be in the moving state X between the time point of $t_1$ and the time point of $t_2$. During this period, the pressure intensity is being detected by the pressure detection unit 136, and determination of whether the pressure intensity is above the threshold value Th or not is performed by the input pattern analysis unit 104. In the example of FIG. 4A, the pressure intensity does not exceed the threshold value Th between the time point of $t_1$ and the time point of $t_2$. Accordingly, the input pattern analysis unit 104 distinguishes the finger to be in a state of touching state P+moving state X.

Next, when the user presses down the finger ($t_3$), information on the pressure intensity indicating pressure intensity exceeding the threshold value Th is input to the input pattern analysis unit 104. Thus, the input pattern analysis unit 104 performs threshold determination by using the information on the pressure intensity input from the pressure detection unit 136, and detects the press-down state Q based on the determination result.

Normally, movement of a finger stops at the time the finger presses down. In the example of FIG. 4A as well, a press-down operation is performed in a state where the finger is temporarily stopped. Accordingly, the input pattern analysis unit 104 detects, at the time point of $t_3$, the rest state Y based on the information on the touch position input from the touch position detection unit 134. That is, in the example of FIG. 4A, it is determined by the input pattern analysis unit 104 at the time point of $t_3$ that the finger is in a state of press-down state Q+rest state Y.

Also, the input pattern analysis unit 104 measures the time period during which the state of press-down state Q+rest state Y continues (hereinafter, press-down duration ΔT). Then, the input pattern analysis unit 104 determines whether the press-down duration exceeds a specific time $\Delta T_{th}$ or not. Here, it is assumed that the specific time $\Delta T_{th} > |t_4 - t_3|$. In the example of FIG. 4A, the finger is detached from the touch panel 102 at the time point of $t_4$. Accordingly, since the press-down duration $\Delta T = |t_4 - t_3| < \Delta T_{th}$, it is determined by the input pattern analysis unit 104 that the press-down duration is short.

The state of the finger is distinguished by the input pattern analysis unit 104 in the manner described above. Additionally, in the example of FIG. 4A, (1) touching state P+rest state Y is detected during the period of $t_0$ to $t_1$, (2) touching state P+moving state X is detected during the period of $t_1$ to $t_2$, (3) touching state P+rest state Y is detected during the period of $t_2$ to $t_3$, and (4) press-down state Q+rest state Y is detected during the period of $t_3$ to $t_4$. (5) Furthermore, the press-down duration ΔT is measured by the input pattern analysis unit 104, and it is detected that the press-down duration is short based on the comparison with the specific time $\Delta T_{th}$.

The state of the finger and the press-down duration detected in this manner are notified to the command execution unit 106. When the state of the finger and the press-down duration are notified, the command execution unit 106 executes, based on the state of the finger, the press-down duration, and the information on the touch position input from the touch position detection unit 134, a command corresponding to these pieces of input information.

(Determination Method: Plurality of Times of Press-Down Operations)

Next, reference will be made to FIG. 4B. The upper half of FIG. 4B (Move-Time; movement data) shows the change in the state of a finger (H: moving state X, L: rest state Y) obtained from information on the touch position. Also, the lower half of FIG. 4B (Intensity-Time; intensity data) shows the change in the state of the finger (touching state P/press-down state Q) obtained from information on the pressure intensity. The example of FIG. 4B is obtained in a case a finger is moved while in a touching state, and then the finger presses down a plurality of times while in a rest state.

First, when the user touches the touch panel 102 ($t_0$), the touch position is detected by the touch position detection unit 134, and is input to the input pattern analysis unit 104. When the information on the touch position is input, the change in the touch position that is input is analysed by the input pattern analysis unit 104, and whether the moving state of the finger is in the moving state X or in the rest state Y is distinguished.

Furthermore, the pressure intensity is detected by the pressure detection unit 136 at the time point of $t_0$, and is input to the input pattern analysis unit 104. When information on the pressure intensity is input, whether the input pressure intensity is above the threshold value Th or not is determined and whether the pressing state of the finger is the touching state P or the press-down state Q is distinguished, by the input pattern analysis unit 104. In the example of FIG. 4B, it is detected that it is rest state Y+touching state P at the time point of $t_0$.

Next, when the finger moves while still touching ($t_1 \rightarrow t_2$), the input pattern analysis unit 104 detects the moving state X based on the information on the touch position input from the touch position detection unit 134. During this period, the pressure intensity is being detected by the pressure detection unit 136, and determination of whether the pressure intensity is above the threshold value Th or not is performed by the input pattern analysis unit 104. In the example of FIG. 4B, the pressure intensity does not exceed the threshold value Th between the time point of $t_1$ and the time point of $t_2$. Accordingly, the input pattern analysis unit 104 distinguishes the finger to be in a state of touching state P+moving state X.

Next, when the user presses down the finger ($t_3$), information on the pressure intensity indicating pressure intensity exceeding the threshold value Th is input to the input pattern analysis unit 104. Thus, the input pattern analysis unit 104 performs threshold determination by using the information on the pressure intensity input from the pressure detection unit 136, and detects the press-down state Q based on the determination result. Also, the input pattern analysis unit 104 detects the rest state Y based on the information on the touch position input from the touch position detection unit 134. Accordingly, in the example of FIG. 4B, it is detected by the input pattern analysis unit 104 at the time point of $t_3$ that the finger is in a state of press-down state Q+rest state Y.

In the example of FIG. 4B, after the finger presses down at the time point of $t_3$, the pressure from the finger is weakened once in a period until time point $t_6$, and the press-down is performed once again. However, the finger is not detached from the touch panel 102 during the period of $t_3$ to $t_6$. When such an operation is performed, the pressure intensity input to the input pattern analysis unit 104 falls below the threshold value Th at time point $t_4$ and exceeds the threshold value Th at time point $t_6$. Accordingly, press-down state Q+rest state Y is detected during the period of $t_3$ to $t_4$, touching state P+rest state Y is detected during the period of $t_4$ to $t_5$, and press-down state Q+rest state Y is detected during the period of $t_5$ to $t_6$.

Therefore, the input pattern analysis unit 104 counts the repetitions of the touching state P and the press-down state Q (hereinafter, the number of press-down times) detected from the press-down of the finger until the detaching of the finger. In the example of FIG. 4B, the number of press-down times=2 is detected.

Also, the input pattern analysis unit 104 measures the time period during which the state of press-down state Q+rest state Y continues (the press-down duration $\Delta T_{34}$, $\Delta T_{56}$). Here, $\Delta T_{34}$ means the press-down duration during the period $t_3$ to $t_4$. Also, $\Delta T_{56}$ means the press-down duration during the period $t_5$ to $t_6$. The input pattern analysis unit 104 determines whether the press-down duration exceeds a specific time $\Delta T_{th}$ or not. Here, it is assumed that the specific time $\Delta T_{th} > |t_4 - t_3|$, $\Delta T_{th} > |t_6 - t_5|$. In this case, the input pattern analysis unit 104 determines that both the first press-down duration $\Delta T_{34}$ and the second press-down duration $\Delta T_{56}$ are short.

The state of the finger is distinguished by the input pattern analysis unit 104 in the manner described above. Additionally, in the example of FIG. 4B, (1) touching state P+rest state Y is detected during the period of $t_0$ to $t_1$, (2) touching state P+moving state X is detected during the period of $t_1$ to $t_2$, and (3) touching state P+rest state Y is detected during the period of $t_2$ to $t_3$. Furthermore, (4) press-down state Q+rest state Y is detected during the period of $t_3$ to $t_4$, (5) touching state P+rest state Y is detected during the period of $t_4$ to $t_5$, and (6) press-down state Q+rest state Y is detected during the period of $t_5$ to $t_6$.

(7) Furthermore, the number of repetitions of the press-down state Q and the touching state P detected during the period of $t_3$ to $t_6$ is counted by the input pattern analysis unit 104, and the repetition times is detected. (8) Furthermore, the first ($t_3$ to $t_4$) press-down duration $\Delta T_{34}$ and the second ($t_5$ to $t_6$) press-down duration $\Delta T_{56}$ are measured by the input pattern analysis unit 104, and both are detected to be a short press-down duration based on the comparison with the specific time $\Delta T_{th}$.

The state of the finger, the number of press-down times, and the press-down duration detected in this manner are notified to the command execution unit 106. When the state of the finger, the number of press-down times, and the press-down duration are notified, the command execution unit 106 executes, based on the state of the finger, the number of press-down times, the press-down duration, and the information on the touch position input from the touch position detection unit 134, a command corresponding to these pieces of input information.

(Determination Method: Operation by Long Press-Down Duration)

Next, reference will be made to FIG. 4C. The upper half of FIG. 4C (Move-Time; movement data) shows the change in the state of a finger (H: moving state X, L: rest state Y) obtained from information on the touch position. Also, the lower half of FIG. 4C (Intensity-Time; intensity data) shows the change in the state of the finger (touching state P/press-down state Q) obtained from information on the pressure intensity. The example of FIG. 4C is obtained in a case a finger is moved while in a touching state, and then the finger presses down for a long time while in a rest state.

First, when the user touches the touch panel 102 ($t_0$), the touch position is detected by the touch position detection unit 134, and is input to the input pattern analysis unit 104. When the information on the touch position is input, the change in the touch position that is input is analysed by the input pattern analysis unit 104, and whether the moving state of the finger is in the moving state X or in the rest state Y is distinguished.

Furthermore, the pressure intensity is detected by the pressure detection unit 136 at the time point of $t_0$, and is input to the input pattern analysis unit 104. When information on the pressure intensity is input, whether the input pressure intensity is above the threshold value Th or not is determined and whether the pressing state of the finger is the touching state P or the press-down state Q is distinguished, by the input pattern analysis unit 104. In the example of FIG. 4C, it is detected that it is rest state Y+touching state P at the time point of $t_0$.

Next, when the finger moves while still touching ($t_1 \rightarrow t_2$), the input pattern analysis unit 104 detects the moving state X based on the information on the touch position input from the touch position detection unit 134. For example, the input pattern analysis unit 104 determines that the state of the finger is the moving state X, in a case a major change in the touch position that exceeds a specific range is detected.

In the example of FIG. 4C, the finger is determined to be in the moving state X between the time point of $t_1$ and the time point of $t_2$. During this period, the pressure intensity is being detected by the pressure detection unit 136, and determination of whether the pressure intensity is above the threshold value Th or not is performed by the input pattern analysis unit 104. In the example of FIG. 4C, the pressure intensity does not exceed the threshold value Th between the time point of $t_1$ and the time point of $t_2$. Accordingly, the input pattern analysis unit 104 distinguishes the finger to be in a state of touching state P+moving state X.

Next, when the user presses down the finger ($t_3$), information on the pressure intensity indicating pressure intensity exceeding the threshold value Th is input to the input pattern analysis unit 104. Thus, the input pattern analysis unit 104 performs threshold determination by using the information on the pressure intensity input from the pressure detection unit 136, and detects the press-down state Q based on the determination result. Also, the input pattern analysis unit 104 detects the rest state Y at the time point of $t_3$ based on the information on the touch position input from the touch position detection unit 134. Accordingly, it is determined by the input pattern analysis unit 104 at the time point of $t_3$ that the finger is in a state of press-down state Q+rest state Y.

Also, the input pattern analysis unit 104 measures the time period during which the state of press-down state Q+rest state Y continues (hereinafter, press-down duration $\Delta T$). Then, the input pattern analysis unit 104 determines whether the press-down duration exceeds a specific time $\Delta T_{th}$ or not. Here, it is assumed that the specific time $\Delta T_{th} < \Delta T$. In the example of FIG. 4C, the finger is detached from the touch panel 102 at the time point of $t_4$. Accordingly, since the press-down duration $\Delta T = |t_4 - t_3| > \Delta T_{th}$, it is determined by the input pattern analysis unit 104 that the press-down duration is long.

The state of the finger is distinguished by the input pattern analysis unit 104 in the manner described above. Additionally, in the example of FIG. 4C, (1) touching state P+rest state Y is detected during the period of $t_0$ to $t_1$, (2) touching state P+moving state X is detected during the period of $t_1$ to $t_2$, (3) touching state P+rest state Y is detected during the period of $t_2$ to $t_3$, and (4) press-down state Q+rest state Y is detected during the period of $t_3$ to $t_4$. (5) Furthermore, the press-down duration $\Delta T$ is measured by the input pattern analysis unit 104, and it is detected that the press-down duration is long based on the comparison with the specific time $\Delta T_{th}$.

The state of the finger and the press-down duration detected in this manner are notified to the command execution unit 106. When the state of the finger and the press-down duration are notified, the command execution unit 106 executes, based on the state of the finger, the press-down duration, and the information on the touch position input from the touch position detection unit 134, a command corresponding to these pieces of input information.

(Operational Flow)

Next, the flow of operation of the input pattern analysis unit 104 in relation to the finger state determination will be described with reference to FIG. 5. FIG. 5 is an explanatory diagram showing an example of a state determination method according to the present embodiment. Additionally, the example of FIG. 5 assumes a range selection operation by a drag operation and a specific command execution operation in relation to the selected range. Also, the operational flow of FIG. 5 is to be performed in a state where the user's finger is in touch with the touch panel 102.

First, the input pattern analysis unit 104 determines whether the finger is detached from the touch panel 102 or not, based on the presence/absence of the information on the pressure intensity from the pressure detection unit 136 or based on the presence/absence of the information on the touch position from the touch position detection unit 134 (S102). In a case the finger is detached, the input pattern analysis unit 104 ends a series of the determination processes. In a case the finger is not detached, the input pattern analysis unit 104 proceeds to the process of step S104.

In a case it proceeded to the process of step S104, the input pattern analysis unit 104 determines whether the finger is moving or not, based on the information on the touch position input from the touch position detection unit 134 (S104). That is, a process of distinguishing the moving state X and the rest state Y is performed in step S104. In a case the finger is in the moving state X, the input pattern analysis unit 104 proceeds to the process of step S106. On the other hand, in a case the finger is in the rest state Y, the input pattern analysis unit 104 proceeds to the process of step S108.

In a case it proceeded to the process of step S106, the input pattern analysis unit 104 changes the selected range in accordance with the movement of the touch position, based on the information on the touch position input by the touch position detection unit 134 (S106). For example, in a case an operation of selecting a character string is performed, the input pattern analysis unit 104 changes the range of the selected character string in accordance with the movement of the touch position so that a character string traced by the finger is included in the selected range. Also, in a case an operation of selecting an image range is performed, the input pattern analysis unit 104 changes the selected range within the image in accordance with the movement of the touch position. When the change operation of the selected range is complete, the input pattern analysis unit 104 again proceeds to the process of step S102.

In a case it proceeded to the process of step S108 from step S104, the input pattern analysis unit 104 detects the repetition of the touching state P and the press-down state Q based on the information on the pressure intensity input from the pressure detection unit 136, and counts the number of press-down times. Then, the input pattern analysis unit 104 determines whether the number of press-down times is a specific number of times or not (S108). In a case the number of press-down times is the specific number of times, the input pattern analysis unit 104 proceeds to the process of step S110. On the other hand, in a case the number of press-down times is not the specific number of times, the input pattern analysis unit 104 proceeds to the process of step S112.

In a case it proceeded to the process of step S110, the input pattern analysis unit 104 notifies the command execution unit 106 of the number of press-down times. Then, a command assigned to the number of press-down times is executed by the command execution unit 106 (S110), and the series of the determination processes is ended. Also, in a case it proceeded to the process of step S112, the input pattern analysis unit 104 measures the press-down duration, and determines whether or not the press-down duration is a specific time or longer (S112). In a case the press-down duration is the specific time or longer, the input pattern analysis unit 104 proceeds to the process of step S114. On the other hand, in a case the press-down duration is less than the specific time, the input pattern analysis unit 104 proceeds again to the process of step S102.

In a case it proceeded to the process of step S114, the input pattern analysis unit 104 notifies the command execution unit 106 that the press-down duration is long. Then, a command assigned to an operation by a long press-down duration is executed by the command execution unit 106 (S114), and the series of processes is ended. As described, when the state determination method according to the present embodiment is adopted, it becomes possible to execute different commands depending on the number of press-down times and the press-down duration. Thus, the user is enabled to execute a command without detaching the finger that changed the selected range from the touch panel 102.

(1-1-4: Application to Character String Processing Application)

Next, application to a character string processing application will be described with reference to FIG. 6. FIG. 6 is an explanatory diagram for describing application to an application capable of performing text manipulation (for example, a text editor, a mailer, or the like). An operation of selecting a character string displayed on a screen with a finger (hereinafter, selection operation), and an operation of executing a command for performing a specific process on the selected character string (hereinafter, command execution operation) are illustrated in FIG. 6.

First, a character string is selected by a user. In the example of FIG. 6, a character string "Shirokiya Department" is selected. The finger is moving during this selection operation, and the state of the finger is the moving state X. Then, when the finger reaches the end of a character string desired to be selected, the state of the finger will be the rest state Y. When the touch panel 102 is pressed down strongly in this state, the press-down state Q is detected by the input pattern analysis unit 104. When the pressure on the touch panel 102 is temporarily weakened and then is made strong again, the press-down state Q is detected again by the input pattern analysis unit 104, and also, the number of press-down times is counted.

For example, in a case the number of press-down times is 1 (Q1), a command for copying the selected character string is executed by the command execution unit 106, and the selected character string is copied. Also, in a case the number of press-down times is 2 (Q2), a command for cutting the selected character string is executed by the command execution unit 106, and the selected character string is cut. When the command for cutting the selected character string is executed, the words "Shirokiya Department" are deleted from the screen. The deletion of words is performed by the display control unit 110. Furthermore, when the state where the touch panel 102 is pressed down strongly is maintained for a while, the press-down duration is measured by the input pattern analysis unit 104, and it is determined to be a long press-down operation (hereinafter, long press-down). For example, in a case it is determined to be the long press-down (Q3), a menu is displayed near the touch position.

As described, with the application to the character string processing application, the selection operation of a character string and the command execution operation in relation to the character string are realized without detaching the finger from the touch panel 102. Thus, probable occurrence of unintentional change in the selected range made at the time of switching from the selection operation to the command execution operation will significantly decrease. Also, since it becomes unnecessary to perform a touch operation, in addition to the selection operation, to execute a command, an erroneous input due to a touch operation performed by mistake can be prevented. Furthermore, since the selection operation and the command execution operation will be able to be performed in succession without detaching the finger from the touch panel 102, the operational efficiency will significantly improve.

Figure 6:
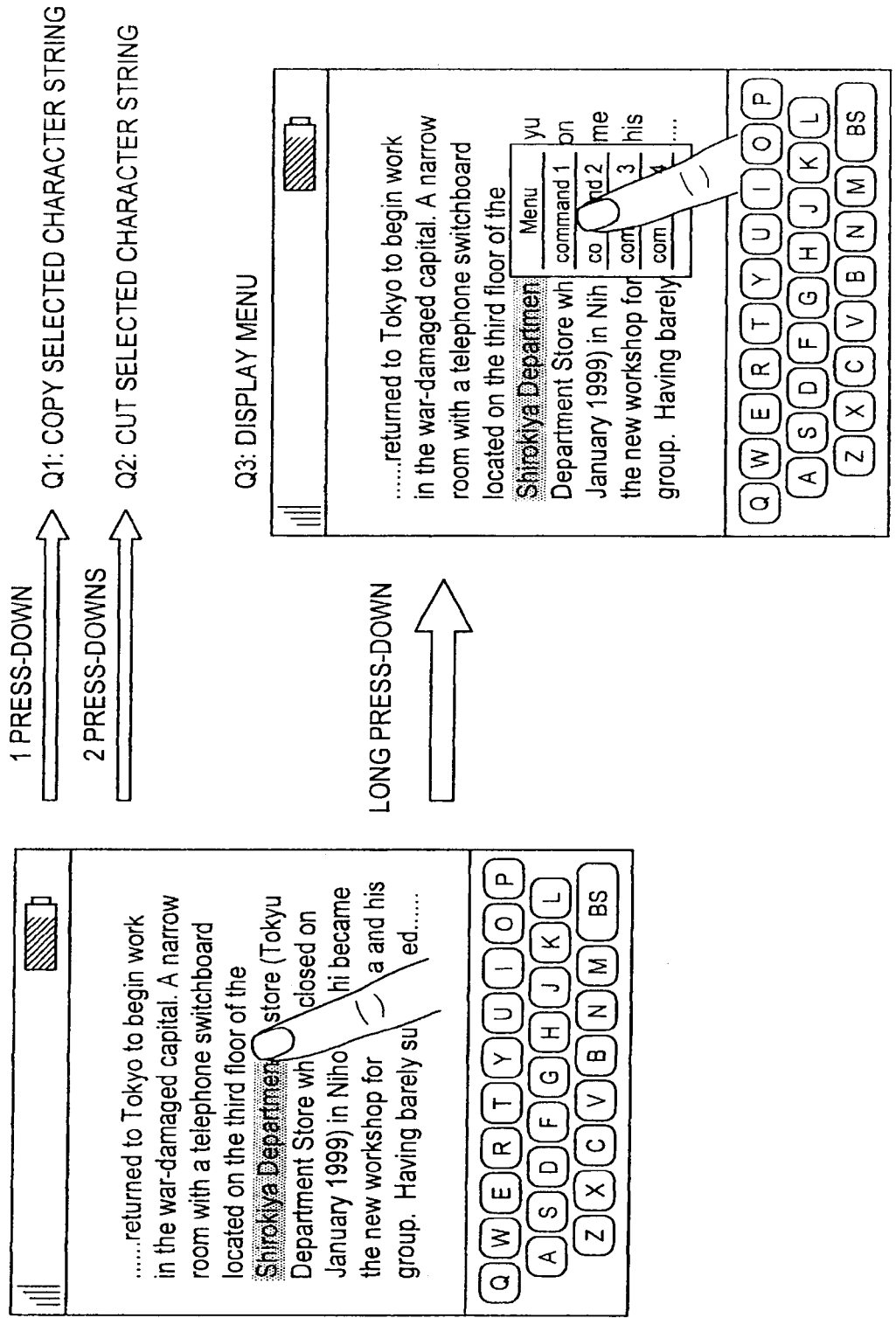
FIG. 6 is an explanatory diagram showing an example of an information processing method according to the embodiment (application to character string processing)

Additionally, as the command, three types, i.e. copy, cut and menu display, are illustrated in FIG. 6, but it is not restricted to such. For example, application to commands relating to various types of character string operations, font changes and the like, such as deletion of selected character string, change of font size, change of font, addition of underline, highlight display, change of typeface, change of font colour, and change of background colour, is possible. Also, in the example of FIG. 6, cases where the numbers of press-down times are 1 and 2 are illustrated, but it is also possible to assign a command to a press-down operation with 3 or more press-downs. Furthermore, a long press-down operation may be invalidated, and only an operation depending on the number of press-down times may be validated.

(1-1-5: Application to Translation Application)

Figure 7A:
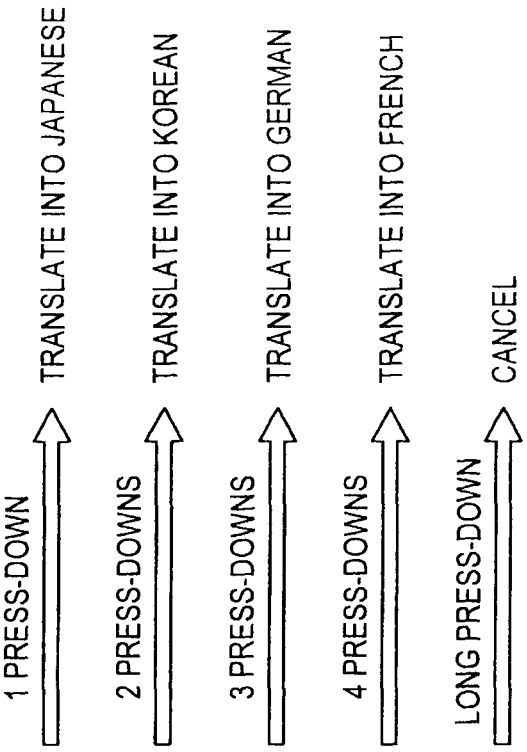
FIG. 7A is an explanatory diagram showing an example of the information processing method according to the embodiment (application to translation application)
Figure 7A:
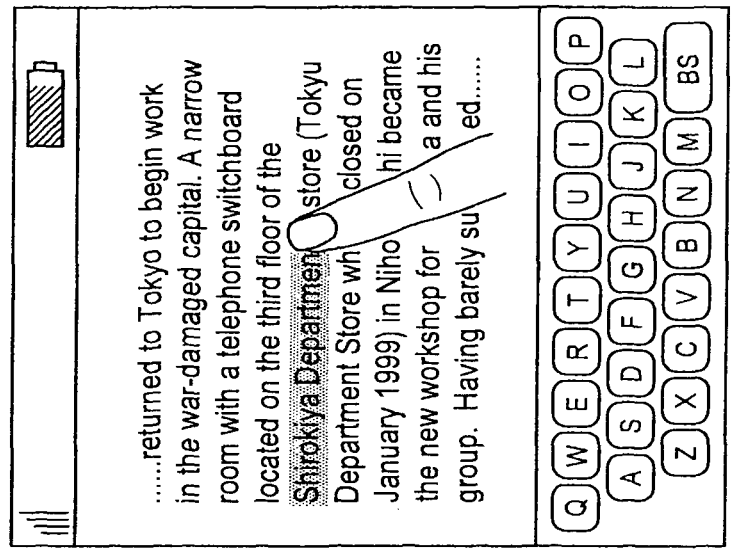

Next, application to a translation application will be described with reference to FIG. 7A. FIG. 7A is an explanatory diagram for describing an example of application to a translation application for selecting a character string expressed in a language and translating the same into another language.

First, a character string is selected by a user. In the example of FIG. 7A, a character string "Shirokiya Department" is selected. The finger is moving during this selection operation, and the state of the finger is the moving state X. Then, when the finger reaches the end of a character string desired to be selected, the state of the finger will be the rest state Y. When the touch panel 102 is pressed down strongly in this state, the press-down state Q is detected by the input pattern analysis unit 104. When the pressure on the touch panel 102 is temporarily weakened and then is made strong again, the press-down state Q is detected again by the input pattern analysis unit 104, and also, the number of press-down times is counted.

For example, in a case the number of press-down times is 1, a command for translating the character string into Japanese is executed by the command execution unit 106, and the selected character string is displayed in Japanese. Also, in a case the number of press-down times is 2, a command for translating the character string into Korean is executed by the command execution unit 106, and the selected character string is displayed in Korean. In a case the number of press-down times is 3, a command for translating the character string into German is executed by the command execution unit 106, and the selected character string is displayed in German. In a case the number of press-down times is 4, a command for translating the character string into French is executed by the command execution unit 106, and the selected character string is displayed in French.

Furthermore, when a state where the touch panel 102 is pressed down strongly is maintained for a while, the press-down duration is measured by the input pattern analysis unit 104, and it is determined to be a long press-down. In a case it is determined to be the long press-down, the translation process based on the press-down operation is cancelled, for example. For example, a process of translation into Japanese is started with one press-down, but when the long press-down operation is performed in immediate succession, the translation into Japanese is cancelled. Also, a process of translation into Korean is started with two successive press-downs, but when the long press-down operation is performed in immediate succession, the translation into Korean is cancelled. As described, by associating the long press-down with cancellation, an undesired operation can be swiftly cancelled before it is confirmed.

As described, with the application to the translation application, the selection operation of a character string and the translation command execution operation for the character string are realized without detaching the finger from the touch panel 102. Also, since the language can be selected by the number of press-down times, operations from the selection of a character string to the translation, including the operation of language selection, are realized without detaching the finger from the touch panel 102. Since it becomes possible to perform a series of processes in succession without detaching the finger from the touch panel 102, the operational efficiency will significantly improve.

Additionally, Japanese, Korean, German and French are shown in FIG. 7A as examples of language, but the language is not limited to these and any language that can be handled by the translation application can be used. Furthermore, cases where the numbers of press-down times are 1 to 4 are illustrated in the example of FIG. 7A, but it is also possible to assign a command to a press-down operation with 5 or more press-downs.

(1-1-6: Application to Search Application)

Next, application to a search application will be described with reference to FIG. 7B. FIG. 7B is an explanatory diagram for describing an example of application to a search application for selecting a character string in a sentence and for performing a Web search with the selected character string as a keyword.

First, a character string is selected by a user. In the example of FIG. 7B, a character string "Shirokiya Department" is selected. The finger is moving during this selection operation, and the state of the finger is the moving state X. Then, when the finger reaches the end of a character string desired to be selected, the state of the finger will be the rest state Y. When the touch panel 102 is pressed down strongly in this state, the press-down state Q is detected by the input pattern analysis unit 104. When the pressure on the touch panel 102 is temporarily weakened and then is made strong again, the press-down state Q is detected again by the input pattern analysis unit 104, and also, the number of press-down times is counted.

For example, in a case the number of press-down times is 1, search engine A is selected by the command execution unit 106, and a Web search using search engine A is performed with the selected character string as a keyword. Also, in a case the number of press-down times is 2, search engine B is selected by the command execution unit 106, and a Web search using search engine B is performed with the selected character string as a keyword. Furthermore, when a state where the touch panel 102 is pressed down strongly is maintained for a while, the press-down duration is measured by the input pattern analysis unit 104, and it is determined to be a long press-down. In a case it is determined to be the long press-down, the Web search process based on the press-down operation is cancelled.

For example, a Web search using search engine A is started with one press-down, but when the long press-down operation is performed in immediate succession, the Web search process is cancelled. Also, a Web search using search engine B is started with two successive press-downs, but when the long press-down operation is performed in immediate succession, the Web search process using search engine B is cancelled. As described, by associating the long press-down with cancellation, a Web search can be swiftly cancelled.

As described, with the application to the search application, the selection operation of a character string and the execution operation of a command for a Web search with the character string as a keyword are realized without detaching the finger from the touch panel 102. Particularly, since the type of the search engine is selected according to the number of press-down times, operations from the selection of a character string to the Web search, including the selection operation of a search engine, are realized without detaching the finger from the touch panel 102. Since it becomes possible to perform a series of processes in succession without detaching the finger from the touch panel 102, the operational efficiency will significantly improve. Additionally, a case where the numbers of press-down times are 1 and 2 is illustrated in the example of FIG. 7B, but it is also possible to assign other search engine to a press-down operation with 3 or more press-downs.

(1-1-7: Application to Map Application)

Next, application to a map application will be described with reference to FIG. 7C. FIG. 7C is an explanatory diagram for describing an example of application to a map application capable of displaying an image after enlarging or reducing the same. Additionally, a map application is taken as an example here, but application is also possible to an imaging application capable of displaying an image after enlarging or reducing the same.

First, a part of an image is selected by a user. In the example of FIG. 7C, a part of an image is already selected. The state of the finger will the moving state X at the time of selecting a part of an image, but since the selection of an image is already made in the example of FIG. 7C, the state of the finger is already the rest state Y. When the touch panel 102 is pressed down strongly in this state, the press-down state Q is detected by the input pattern analysis unit 104. When the pressure on the touch panel 102 is temporarily weakened and then is made strong again, the press-down state Q is detected again by the input pattern analysis unit 104, and also, the number of press-down times is counted. Additionally, the selected part of the image will be referred to as an enlargement area.

For example, in a case the number of press-down times is 1, the enlargement area is enlarged by the command execution unit 106 at a specific magnification. When pressed down successively, the enlarged enlargement area is further enlarged by the command execution unit 106 at the specific magnification. That is, the enlargement area is enlarged and displayed stage by stage according to the number of press-down times. Furthermore, when a state where the touch panel 102 is pressed down strongly is maintained for a while, the press-down duration is measured by the input pattern analysis unit 104, and it is determined to be a long press-down. In a case it is determined to be the long press-down, the image is reduced to the size before enlargement. That is, the enlargement operation is cancelled. As described, by associating the long press-down with cancellation, the image can be swiftly returned to its original display state before enlargement.

As described, with the application to the map application, the selection operation of an enlargement area and the enlargement operation of the enlargement area can be realized without detaching the finger from the touch panel 102. Particularly, since the magnification is increased according to the number of press-down times, a series of operations including the adjustment of the magnification is realized without detaching the finger from the touch panel 102. Since it becomes possible to perform a series of processes in succession without detaching the finger from the touch panel 102, the operational efficiency will significantly improve. Additionally, a case where the numbers of press-down times are 1 and 2 is illustrated in the example of FIG. 7C, but it is also possible to further enlarge the enlargement area according to the number of press-down times when the number of press-down times is 3 or more. Also, the enlargement area of the previous stage may be displayed by a long press-down.

2: Second Embodiment

Next, the second embodiment of the present invention will be described. The main difference between the present embodiment and the first embodiment described above lies in the configuration of the touch panel. In the first embodiment described above, the pressure detection unit 136 for detecting the intensity of a pressure was provided as means for detecting the pressure intensity. However, the pressure intensity can be detected without actually measuring the pressure. For example, the pressure intensity can also be obtained by using an optical touch panel configured from a light source (for example, a back light or the like) provided within the display screen and an optical sensor. The present embodiment uses such optical touch panel.

<2-1: Configuration of Information Processing Apparatus 200>

First, the functional configuration of an information processing apparatus 200 according to the present embodiment will be described with reference to FIG. 8. FIG. 8 is an explanatory diagram showing an example of the functional configuration of the information processing apparatus 200 according to the present embodiment. Additionally, the functions of the information processing apparatus 200 illustrated in FIG. 8 can be realized by the hardware configuration shown in FIG. 10. Furthermore, structural elements that have substantially the same functions as those of the information processing apparatus 100 according to the first embodiment described above are denoted with the same reference numerals, and repeated explanation of these structural elements is omitted.

Figure 8:
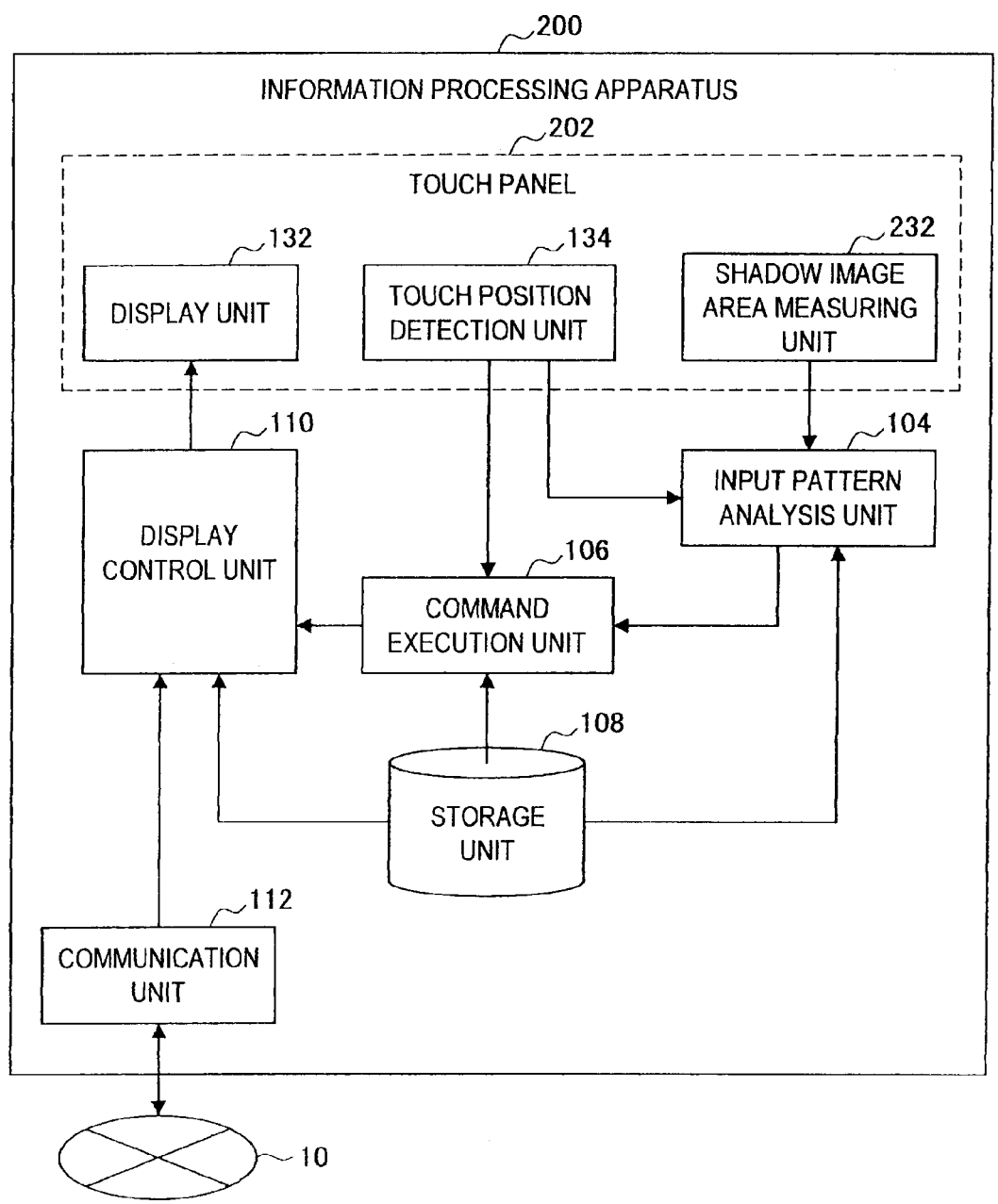
FIG. 8 is an explanatory diagram showing an example of the functional configuration of an information processing apparatus according to a second embodiment of the present invention.

As shown in FIG. 8, the information processing apparatus 200 is mainly configured from a touch panel 202, the input pattern analysis unit 104, the command execution unit 106, the storage unit 108, the display control unit 110, and the communication unit 112. The difference with the information processing apparatus 100 according to the first embodiment described above lies mainly in the configuration of the touch panel 202. Thus, an explanation will be given mainly on the configuration of the touch panel 202.

As shown in FIG. 8, the touch panel 202 includes the display unit 132, the touch position detection unit 134, and a shadow image area measuring unit 232. Pressure intensity detection means of the touch panel 202 is the shadow image area measuring unit 232. The touch panel 202 is an optical touch panel. Here, it is assumed that a light source for emitting light from within the display screen and an optical sensor for detecting light entering from the surface of the display screen are included in the touch panel 202.

Figure 9:
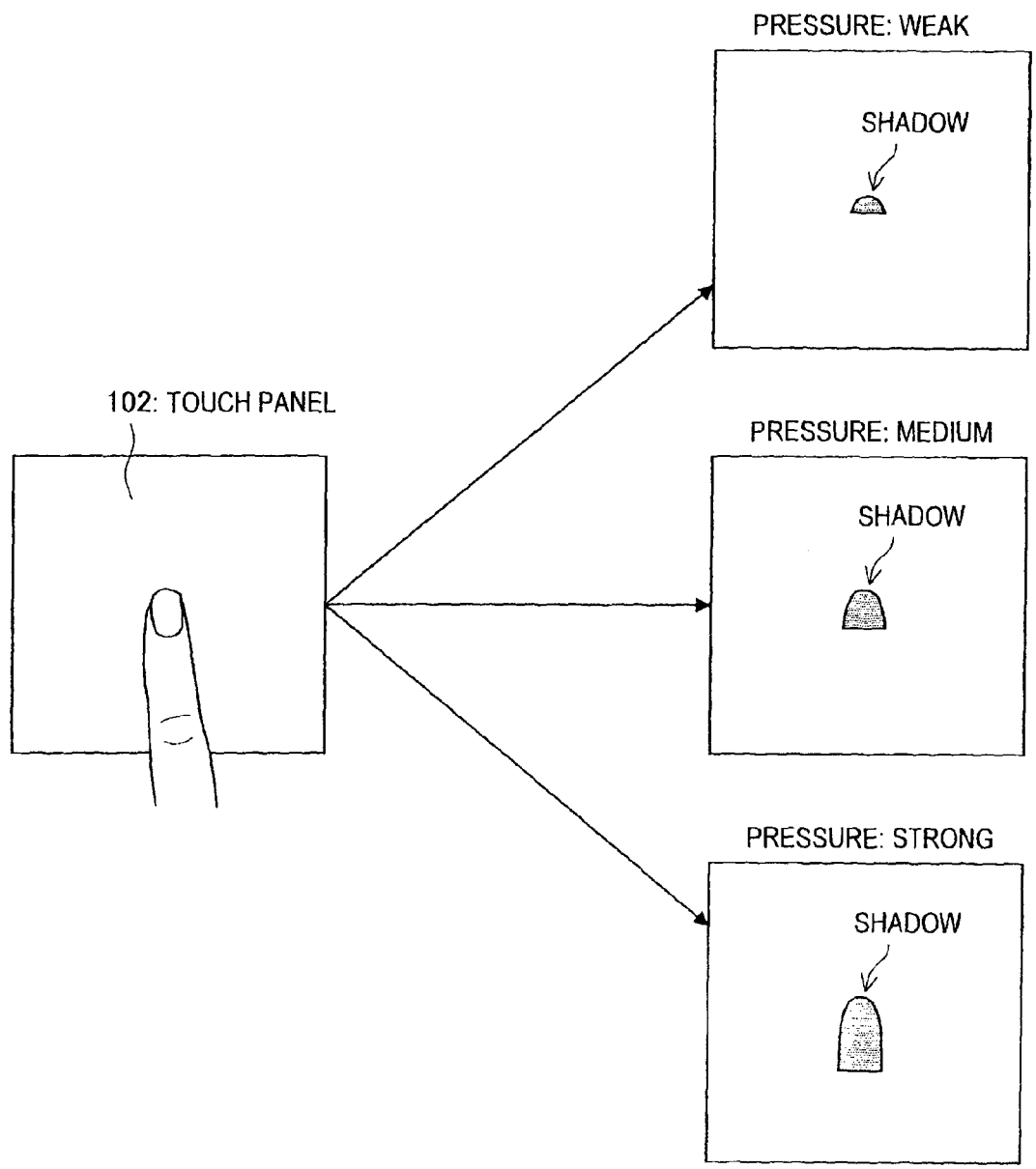
FIG. 9 is an explanatory diagram showing a partial operation of a shadow image area measuring unit included in the information processing apparatus according to the embodiment.

When a finger is touching the display screen, a part of the light emitted from the light source is reflected by the finger and enters the optical sensor. Also, light not reflected by the finger is not received by the optical sensor. Thus, by forming an image from the distribution of light that entered the optical sensor, the shape of the finger pressing the surface of the touch panel 202 is obtained as an image. For example, when a portion where the intensity of the reflected light is strong is expressed as a shadow, image patterns as shown in FIG. 9 are obtained. A small shadow is obtained for a portion that is pressed weakly, and as the pressure grows, a larger part of the finger is pressed against the touch panel 202, and thus the area of the shadow gradually becomes larger. Therefore, the pressure intensity at each touch position can be detected by measuring the area of the shadow.

Accordingly, the touch position detection unit 134 detects a position where a shadow is obtained as the touch position, and inputs the detection result to the input pattern analysis unit 104. Also, the shadow image area measuring unit 232 acquires the area of each shadow, and inputs the size of the area to the input pattern analysis unit 104 as information on the pressure intensity. As described, information on the touch position and information on the pressure intensity are input to the input pattern analysis unit 104. Accordingly, matching between an input pattern and a registered pattern can be performed in the same manner as the first embodiment described above. Additionally, processes subsequent to the process by the input pattern analysis unit 104 are the same as those of the first embodiment, and description thereof is omitted.

Heretofore, the second embodiment of the present invention has been described.

3: Hardware Configuration Example

Figure 10:
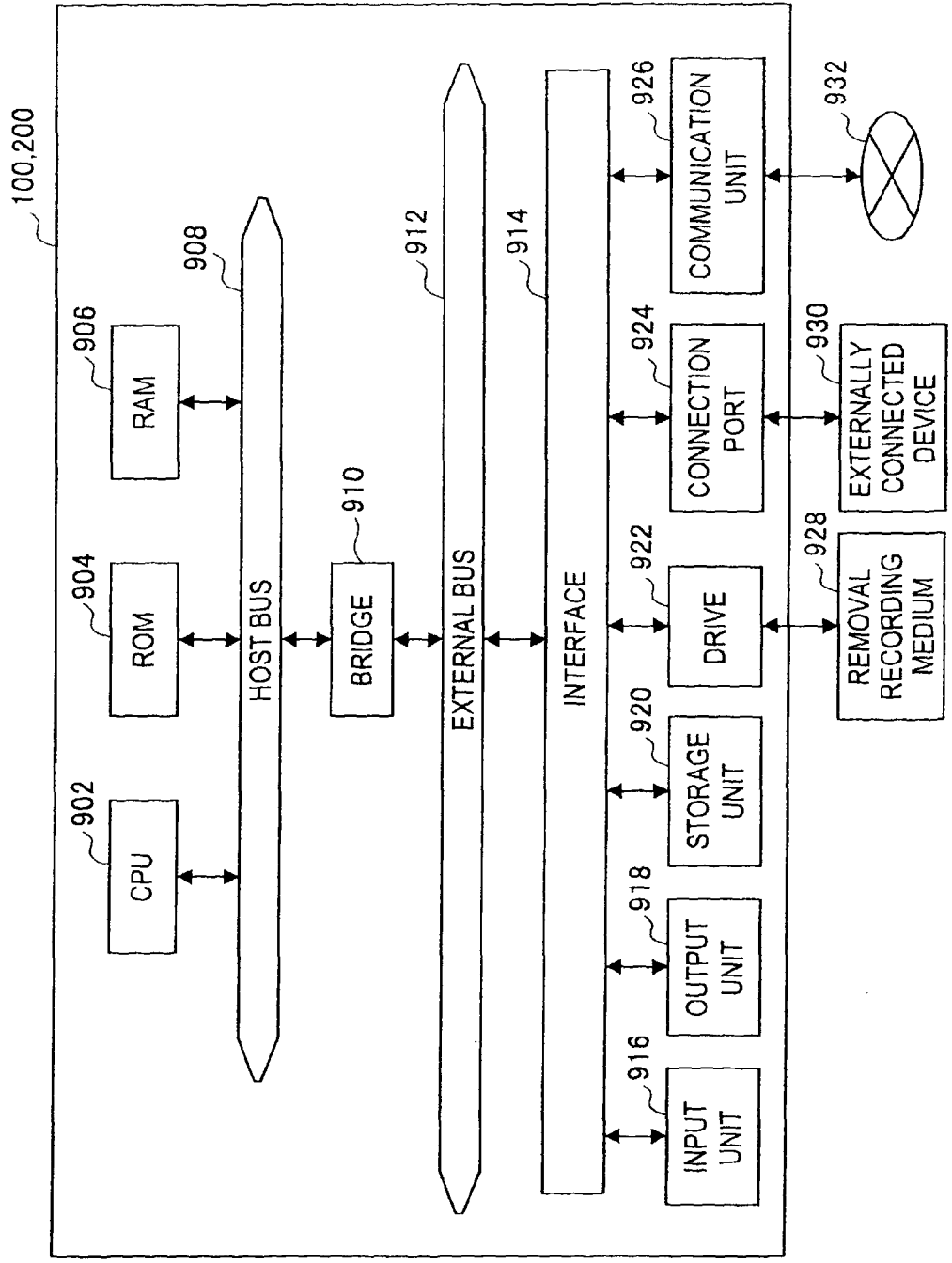
FIG. 10 is an explanatory diagram showing an example of the hardware configuration of the information processing apparatus according to each embodiment of the present invention.

The function of each structural element of the information processing apparatuses 100 and 200 described above can be realized by using the hardware configuration of an information processing apparatus shown in FIG. 10, for example. That is, the function of each structural element is realized by controlling the hardware shown in FIG. 10 by using a computer program.

Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 10, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an IC card on which a non-contact IC chip is mounted or an electronic device. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

4: Summary

Lastly, the technical contents according to the first and second embodiments of the present invention will be briefly described. The technical contents stated here can be applied to various information processing apparatuses, such as a personal computer, a mobile phone, a portable game machine, a portable information terminal, an information appliance, a car navigation system, and the like.

The functional configuration of the information processing apparatus described above can be expressed as follows. This information processing apparatus includes a position detection unit that detects a position of an operating tool pressing a screen, a pressure intensity detection unit that detects pressure intensity of the operating tool, a movement detection unit that detects a movement of the operating tool based on information on the position detected by the position detection unit, and a function providing unit that provides a specific function corresponding to an increase in the pressure intensity in a case a rest state or a subtly-moving state of the operating tool is detected by the movement detection unit and the pressure intensity detected by the pressure intensity detection unit is increased.

As described, the information processing apparatus described above can detect the position of an operating tool, and can detect, based on the detection result, the movement of the operating tool. Furthermore, the information processing apparatus described above can detect the pressure intensity of the operating tool. Also, in a case the operating tool fell into a rest state or a subtly-moving state and the pressure intensity increased, the information processing apparatus described above can provide a specific function corresponding to the operation of increasing the pressure intensity. That is, the information processing apparatus described above can provide a specific function assigned to an operation of an operating tool which moves while maintaining a certain pressure intensity, stops the movement and increases the pressure intensity.

Accordingly, a function different from the function realized by the movement of the operating tool is realized by the press-down operation of the operating tool. Additionally, the pressure intensity is increased, and this means that the operating tool is not detached from the target that is being pressed and that the movement operation and the press-down operation are performed in succession. By enabling to perform successive operations without detaching the operating tool from the target that is being touched, it becomes possible to reduce probable occurrence of erroneous operation and to significantly improve the operational efficiency.

(Notes)

The touch position detection unit 134 described above is an example of the position detection unit. The pressure detection unit 136 and the shadow image area measuring unit 232 described above are examples of the pressure intensity detection unit. The input pattern analysis unit 104 described above is an example of the movement detection unit, the function providing unit, a time measuring unit, and an increase/decrease counter. The command execution unit 106, the display control unit 110, and the communication unit 112 described above are examples of the function providing unit.

It should be understood by those skilled in the art that various modifications, combinations, sub-combinations and alterations may occur depending on design requirements and other factors insofar as they are within the scope of the appended claims or the equivalents thereof.

In the above, the explanation has been given with the character string processing application, the search application, and the map application as the examples, but the application scope of the technology according to the present embodiment is not limited to these examples. Application is also possible to any application that selects a range of character string, a range of image, or the like, and that performs a specific process in relation to the selected range.

Also, the type (function) of a command assigned to the number of press-down times is not limited to the examples described above. Also, the type (function) of a command assigned to the long press-down is not limited to the examples described above. Furthermore, if an operation that is performed frequently is assigned to a single or a double press-down and all the other operations are displayed as a context menu at the time of the long press-down, a faster and more convenient operating system can be realized. Modification as such is, of course, within the application scope of the technology according to the present embodiment.

The present application contains subject matter related to that disclosed in Japanese Priority Patent Application JP 2009-197002 filed in the Japan Patent Office on Aug. 27, 2009, the entire content of which is hereby incorporated by reference.

What is claimed is:

1. An information processing apparatus comprising:
   circuitry configured to:
   detect a position of an operating tool pressing a screen;
   detect pressure intensity of the operating tool;
   detect a movement of the operating tool based on information on the detected position;
   count a number of repetitions of a cycle of changes in the pressure intensity;
   measure a time period of the pressure intensity after increase is maintained, wherein a specific function is determined from a plurality of different specific functions based on a length of the measured time period; and
   provide the specific function from the plurality of different specific functions based on both the detected pressure intensity and the counted number of repetitions;
   provide, in a case of the measured time period is a first predetermined length, one of (1) a function of translating a character string specified as a translation target into a different language than the language of the character string depending on the number of the repetitions counted and (2) a function of searching, with a specified character string as a search target, information on one search engine depending on the number of the repetitions counted; and
   cancel, in a case of the time period measured is a second predetermined length, performing one of (1) the translation operation on the character string specified as a translation target and (2) the search operation having the specified character string in the search target, wherein the second predetermined length is longer than the first predetermined length.

2. The information processing apparatus according to claim 1,
   wherein, in a case of selection of a character string is performed by the movement of the operating tool, the circuitry is further configured to:
   provide, in a case of the measured time period is a first predetermined length, the specific function for processing the character string selected during the movement of the operating tool; and
   cancel, in a case of the measured time period is a second predetermined length, the processing operation on the character string selected during the movement of the operating tool, wherein the second predetermined length is longer than the first predetermined length.

3. The information processing apparatus according to claim 1,
   wherein the circuitry is further configured to:
   provide, in a case of the measured time period is a first predetermined length, a function of enlarging and displaying an image that is an enlargement target at different magnifications depending on the counted number of the repetitions of the increase and decrease; and
   cancel, in a case of the measured time period is a second predetermined length, the enlargement operation on the image that is the enlargement target, wherein the second predetermined length is longer than the first predetermined length.

4. The information processing apparatus according to claim 1, further comprising:
   a light source that emits light from within the screen; and
   an optical sensor that is capable of detecting intensity of light that is reflected by the operating tool pressing the screen at a time the light is emitted from the light source,
   wherein the circuitry is further configured to detect an area of the operating tool that strongly reflected the light emitted from the light source based on the intensity of light detected by the optical sensor, and detects the pressure intensity based on a size of the area.

5. The information processing apparatus according to claim 1, further comprising:
a pressure sensor capable of detecting a pressure, the pressure sensor being provided on the screen,
wherein the circuitry is further configured to detect the pressure intensity of the operating tool based on a level of the pressure detected by the pressure sensor.

6. An information processing method comprising performing by an information processing apparatus the steps of:
detecting a position of an operating tool pressing a screen;
detecting pressure intensity of the operating tool;
counting a number of repetitions of a cycle of changes in the pressure intensity;
detecting a movement of the operating tool based on information on the position detected in the step of detecting a position;
measuring a time period of the pressure intensity; and
providing a specific function from a plurality of different specific functions based on both the detected pressure intensity and the counted number of repetitions, wherein in a case of the time period measured is a first predetermined length, performing one of (1) a function of translating a character string specified as a translation target into a different language than the language of the character string depending on the number of the repetitions counted and (2) a function of searching, with a specified character string as a search target, information on one search engine depending on the number of the repetitions counted, and
cancels, in a case of the time period measured is a second predetermined length, one of (1) the translation operation on the character string specified as a translation target and (2) the search operation having the specified character string in the search target, wherein the second predetermined length is longer than the first predetermined length.

7. The information processing method according to claim 6, further comprising performing by the information processing apparatus the steps of:
wherein, in a case of selection of a character string is performed by the movement of the operating tool,
providing, in a case of the measured time period is a first predetermined length, the specific function for processing the character string selected during the movement of the operating tool, and
canceling, in a case of the measured time period is a second predetermined length, the processing operation on the character string selected during the movement of the operating tool, wherein the second predetermined length is longer than the first predetermined length.

8. A non-transitory computer-readable medium having embodied thereon a program, which when executed by a computer causes the computer to perform a method, the method comprising:
detecting a position of an operating tool pressing a screen;
detecting pressure intensity of the operating tool;
counting a number of repetitions of a cycle of changes in the pressure intensity;
detecting a movement of the operating tool based on information on the position detected by the position detection function;
measuring a time period of the pressure intensity; and
providing a specific function from a plurality of different specific functions based on both the detected pressure intensity and the counted number of repetitions, wherein in a case of the time period measured is a first predetermined length, performing one of (1) a function of translating a character string specified as a translation target into a different language than the language of the character string depending on the number of the repetitions counted and (2) a function of searching, with a specified character string as a search target, information on one search engine depending on the number of the repetitions counted, and
cancels, in a case of the time period measured is a second predetermined length, one of (1) the translation operation on the character string specified as a translation target and (2) the search operation having the specified character string in the search target, wherein the second predetermined length is longer than the first predetermined length.

* * * * *